US 12,088,508 B2

(12) United States Patent
Beruto

(10) Patent No.: US 12,088,508 B2
(45) Date of Patent: Sep. 10, 2024

(54) METHODS FOR DATA TRANSMISSION ON ETHERNET MULTIDROP NETWORKS IMPLEMENTING DYNAMIC PHYSICAL LAYER COLLISION AVOIDANCE

(71) Applicant: Canova Tech S.r.l., Padua (IT)

(72) Inventor: Piergiorgio Beruto, Genoa (IT)

(73) Assignee: Canova Tech S.r.l., Padua (IT)

( * ) Notice: Subject to any disclaimer, the term of this patent is extended or adjusted under 35 U.S.C. 154(b) by 7 days.

(21) Appl. No.: 17/517,943

(22) Filed: Nov. 3, 2021

(65) Prior Publication Data

US 2023/0135690 A1    May 4, 2023

(51) Int. Cl.
| | | |
|---|---|---|
| *H04L 47/78* | (2022.01) | |
| *H04L 43/062* | (2022.01) | |
| *H04L 47/12* | (2022.01) | |
| *H04L 47/762* | (2022.01) | |
| *H04L 47/80* | (2022.01) | |

(52) U.S. Cl.
CPC .......... *H04L 47/781* (2013.01); *H04L 43/062* (2013.01); *H04L 47/12* (2013.01); *H04L 47/762* (2013.01); *H04L 47/801* (2013.01)

(58) Field of Classification Search
CPC ..... H04L 47/781; H04L 43/062; H04L 47/12; H04L 47/762; H04L 47/801
See application file for complete search history.

(56) References Cited

U.S. PATENT DOCUMENTS

| | | | | |
|---|---|---|---|---|
| 2019/0104519 A1* | 4/2019 | Sydir | ...................... | H04W 4/38 |
| 2019/0313446 A1* | 10/2019 | Kim | ...................... | H04W 74/02 |
| 2021/0084675 A1* | 3/2021 | Aijaz | .................. | H04W 72/044 |
| 2022/0250665 A1* | 8/2022 | Canigliula | .......... | B61L 15/0063 |

FOREIGN PATENT DOCUMENTS

JP        H1169431 A  *  3/1999

* cited by examiner

*Primary Examiner* — Nicholas R Taylor
*Assistant Examiner* — Angela Widhalm De Rodriguez
(74) *Attorney, Agent, or Firm* — Maier & Maier, PLLC

(57) ABSTRACT

A method for transmitting data on a communication network, the communication network including a plurality of network nodes connected to one same medium for sending and receiving data signals. The data are transmitted by nodes on the medium during transmission cycles, and each transmission cycle includes a plurality of transmission opportunities each of which is allocated to a respective node based on a node identifier associated with that node. The method provides that at least one node listens to the medium for signals transmitted during a transmission cycle and detects the node identifiers associated with the nodes that used a respective transmission opportunity to transmit at least a signal. Accordingly, the node creates a list of the node identifiers detected, wherein the node identifiers are listed according to the order of the transmission opportunities in the transmission cycle.

20 Claims, 17 Drawing Sheets

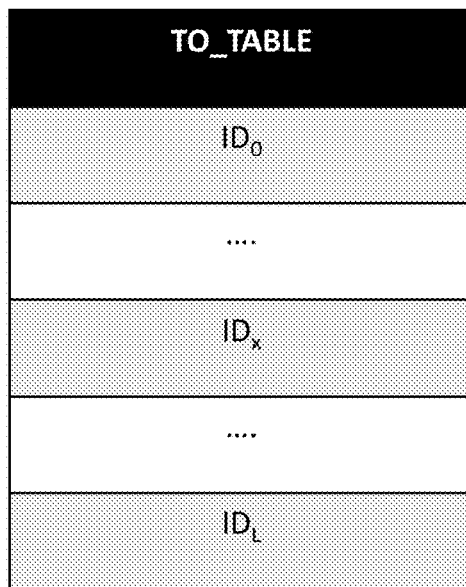

Fig.4

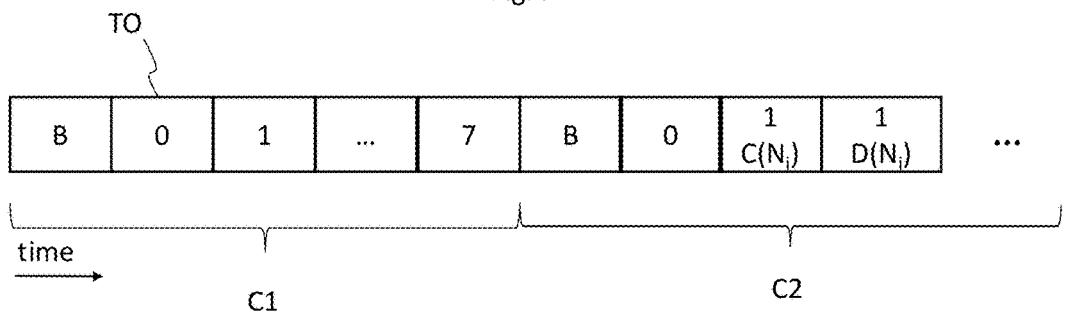

C1
During TX cycle C1, $N_i$, $N_{i-1}$ and $N_{i+1}$ join the network, listen to COMMIT transmitted during each TO, then all take $ID_1$ C2
During TX cycle C2, $N_{i-1}$ and $N_{i+1}$ hear the COMMIT $C(N_i)$ of $N_i$ on TO = 1, thus both take $ID_2$ while $N_i$ successfully transmits data $D(N_i)$ in TO = 1

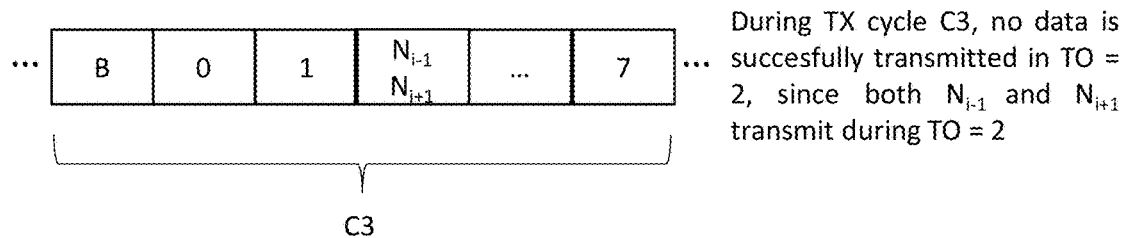

During TX cycle C3, no data is succesfully transmitted in TO = 2, since both $N_{i-1}$ and $N_{i+1}$ transmit during TO = 2

During C4, $N_{i+1}$ hear the COMMIT $C(N_{i-1})$ of $N_{i-1}$ on TO = 2, thus $N_{i+1}$ takes $ID_3$ while $N_{i-1}$ successfully transmits data $D(N_{i-1})$ in TO = 2

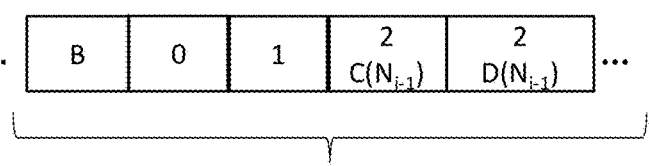

Fig.5

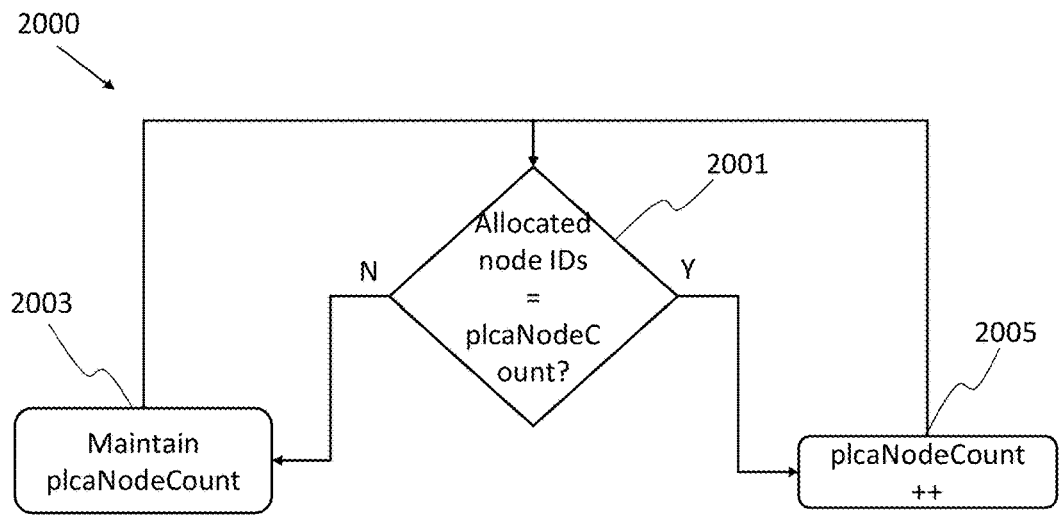

Fig.6

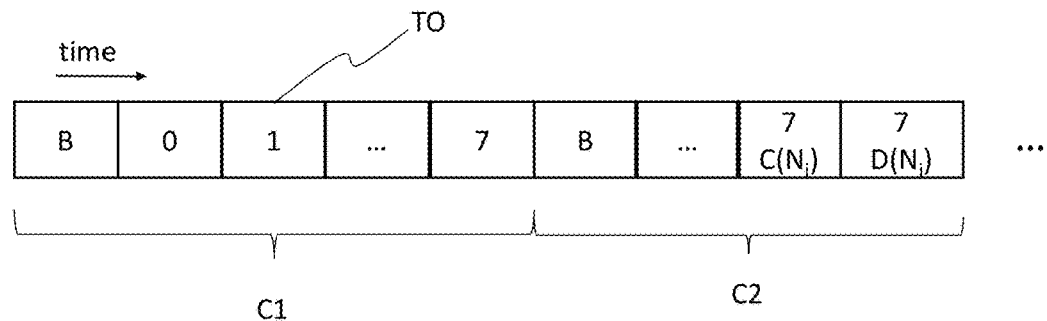

During TX cycle C1, $N_i$ and $N_{i-1}$ listen to COMMITs transmitted, then both select $ID_7$ - i.e., the last available node identifier - since $ID_{0-6}$ are already taken During TX cycle C2, $N_{i-1}$ hears the COMMIT $C(N_i)$ of $N_i$ on TO = 7, but cannot select any other $ID_{0-6}$.
The coordinator node detects that all TO 1 to 7 are used and increase by 1 the number of TO from cycle C3 and thus the number of available node identifiers

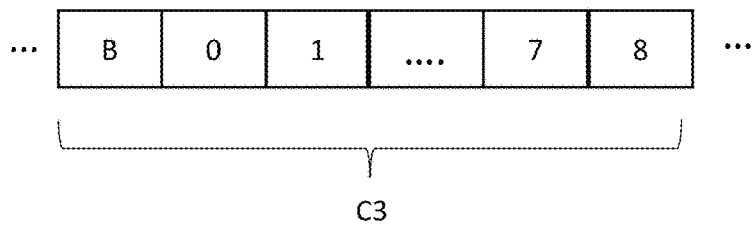

During TX cycle C3, $N_{i-1}$ listen to COMMITs and select $ID_8$

Fig.7

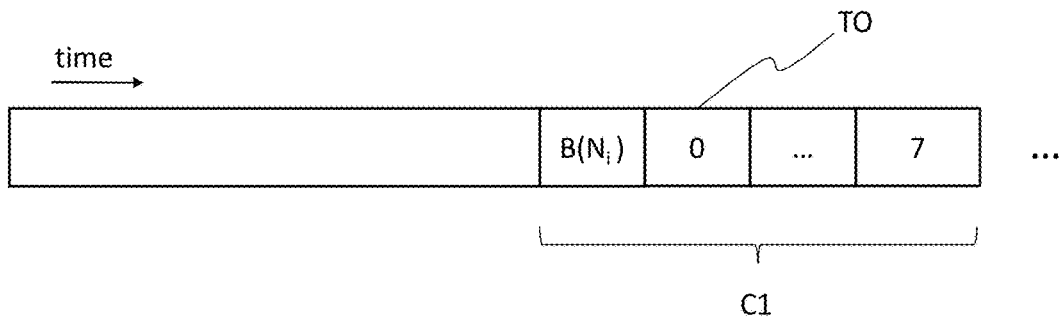

C1, starts with the BEACON transmitted by $N_i$ acting as coordinator node, the other nodes of the network hear the BEACON and renounce operating as coordinator node

Fig.9A

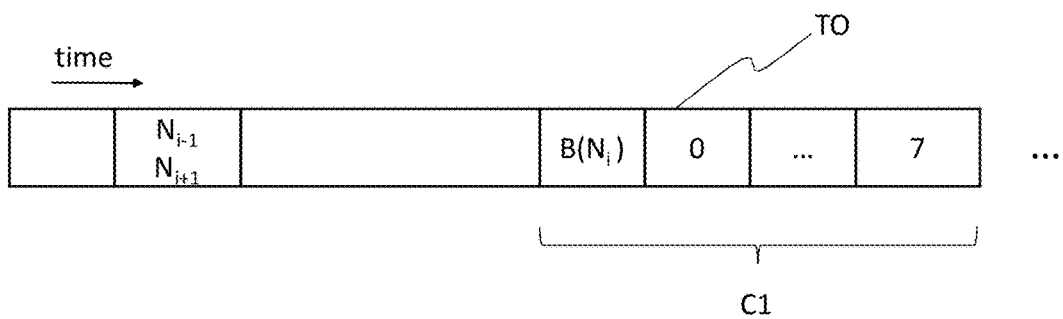

Initially $N_{i-1}$ and $N_{i+1}$ collide preventing them to acquire the status of coordinator node, then C1, starts with the BEACON transmitted by $N_i$ acting as coordinator node, $N_{i-1}$ and $N_{i+1}$ hear the BEACON and renounce operating as coordinator node

Fig.9B

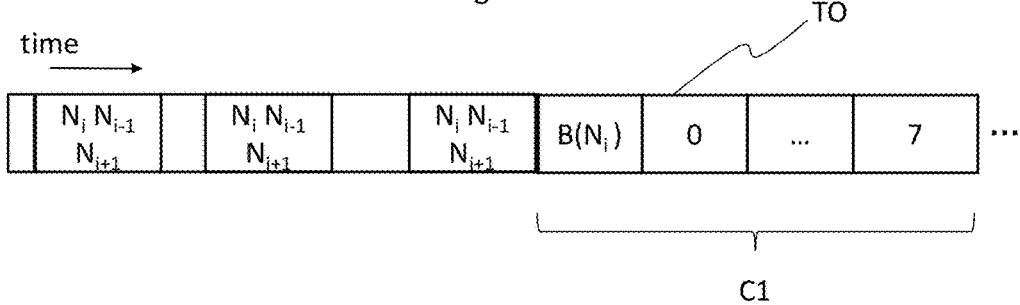

Initially $N_i$, $N_{i-1}$ and $N_{i+1}$ collide repeatedly preventing them to acquire the status of coordinator node, then $N_{i-1}$ and $N_{i+1}$ hear the BEACON by $N_i$ and renounce operating as coordinator node; accordingly, $N_i$ start acting as coordinator node

Fig.9C

| TO_TABLE | |
|---|---|
| ID | AGING |
| $ID_0$ | T0 |
| .... | .... |
| $ID_x$ | Tx |
| .... | .... |
| $ID_L$ | TL |

Fig.10

| TO_TABLE | |
|---|---|
| ID | AGING |
| $ID_0$ | HARD |
| .... | .... |
| $ID_x$ | HARD |
| .... | .... |
| $ID_L$ | SOFT |

Fig.14

METHODS FOR DATA TRANSMISSION ON ETHERNET MULTIDROP NETWORKS IMPLEMENTING DYNAMIC PHYSICAL LAYER COLLISION AVOIDANCE

TECHNICAL FIELD

The invention relates to methods for transmitting signals over communication networks, and in particular over Ethernet multidrop networks.

BACKGROUND

IEEE 802.3 Ethernet standard specifies a MAC (Media Access Control) sublayer, which is able to support half-duplex communication over a multidrop bus, wherein network nodes contend for the use of the physical medium on which transmission is to be carried out.

The MAC sublayer provides for channel access control mechanisms, which are known as multiple access protocols. The most widespread multiple access protocol is CSMA/CD (Carrier Sense Multiple Access with Collision Detection) whose algorithm is specified in the standard IEEE 802.3. CSMA/CD essentially provides for detecting physical collisions and, in case of collision, retrying transmission after a random time.

The mechanism specified by CSMA/CD for managing collision on the physical medium, therefore, causes uncertainty on when data transmission will be completed. Eventually, after too many attempts, transmission is discarded. This mechanism therefore can result in large random latencies, as well as reduction of the media aggregate throughput.

This makes plain CSMA/CD approach unsuitable for networks with deterministic requirements such as industrial automation, automotive and most types of real-time traffic (e.g. audio/video streaming).

The problem of network determinism is addressed in IEEE Standard 802.3cg-2019 and in the US patent application no. US 2019/0230705 by P. Beruto and—A. Orzelli herein incorporated by reference—that proposes Physical Layer Collision Avoidance (PLCA) capabilities, which are designed to provide a deterministic data transmission over Ethernet networks.

While PLCA provide an effective solution to the above-mentioned problem, still PLCA lacks effective procedures to assign and manage node identifiers and corresponding transmission opportunities to nodes of the Ethernet network. Particularly, PLCA may be unsuitable for "plug & play" systems where nodes can dynamically join and leave the network.

SUMMARY

In one aspect, the invention is directed to a method for transmitting data on a communication network.

The communication network includes a plurality of network nodes connected to one same medium for sending and receiving data signals. In the network data are transmitted by nodes on the medium during transmission cycles. Each transmission cycle includes a plurality of transmission opportunities each of which is allocated to a respective node based on a node identifier associated with that node.

The method provides that at least one node listens to the medium for signals transmitted during a transmission cycle and detects the node identifiers associated with the nodes that used a respective transmission opportunity to transmit at least a signal. Accordingly, the node creates a list of the node identifiers detected, wherein the node identifiers are listed according to the order of the transmission opportunities in the transmission cycle.

Based on said list, the node selects from the list an unused node identifier and listens to the medium for a transmission listening time from the start of the transmission opportunity associated with the selected node identifier. If no signal is heard during the transmission listening time, uses the transmission opportunity associated with the selected node identifier. Conversely, if a signal from another node is heard during the listening time, adds the currently selected node identifier to the list of detected nodes. Then the node iterates the steps above until a data transmission is completed.

The method allows for an efficient and effective dynamic self-allocation of the nodes of the network to node identifier and, accordingly, to transmission opportunities, without the need to exploit any collision detection or managing entity. Such an advantage is especially important in the case of industrial/automotive networks wherein collision detection mechanisms show low reliability, are complex to implement and can lead to a complete misalignment of the allocation of node identifiers leading to malfunctions, up to a catastrophic failure, of the network.

The method does not require any centralized control to allocate successfully the nodes to the available transmission opportunities. Advantageously, the method does not require adjustments or the addition of any physical signalling to operate correctly. Furthermore, the method manages plug and play connection of nodes to the network seamlessly, without the need of implementing extra steps or procedures.

Last but not least, a node identifier and a corresponding transmission opportunity are re-used for a plurality of consecutive cycles of transmission opportunities, until another node in the network "steals" the node identifier to the current node.

In an embodiment, a node of the plurality of nodes operates as coordinator node that is configured to transmit a beacon signal that communicating the start of a respective transmission cycle.

Preferably, the coordinator node listens to the medium for signals transmitted during each transmission cycle, and when detects that all the transmission opportunities of the transmission cycle are used, adds at least a further transmission opportunity to the next transmission cycles.

In addition or as an alternative, the coordinator node detects that a penultimate transmission opportunity is not used for a predetermined number of consecutive transmission cycles, removes the added transmission opportunity from the next transmission cycles.

Thanks to these solutions, it is possible to dynamically adjust the size of the cycle of transmission opportunity to the effective number of nodes of the network that request to transmit through the medium of the network.

In an embodiment, at least one node listens to the medium for detecting a beacon signal transmitted by a coordinator node, said beacon signal communicating the start of a respective transmission cycle, and if does not detect the beacon signal within a beacon listening time:

selects a coordinator node identifier;
   listens to the medium for detecting a beacon signal transmitted by another node during a further beacon listening time,
   if does not detect the beacon signal within the further beacon listening time, transmits the beacon signal over the medium, and
   if detects the beacon signal within the further beacon listening time, iterate the method.

In this manner, it is possible to have nodes of the network that automatically assume the role of the coordinator node ensuring a continuous operation of the network even when a current coordinator node undergoes a malfunction, a power down, is unplugged from the network, the connection with the medium is lost or other similar events.

In an embodiment, at least one node associates an age value to each node identifier included in the list of the node identifiers.

For each cycle in which a transmission opportunity is not used, reduces the age value of the corresponding node identifier, and when one of the age values reaches a threshold value, removes the corresponding node identifier from the list.

Preferably, at least a node having a last node identifier associated with a last transmission opportunity of the transmission cycle, when at least one node identifier is removed from the list, and the currently selected node identifier is the last of the list, selects the at least one removed node identifier, and reiterates the method according to one of the embodiments above described.

According to these solutions, any transmission opportunities unused are made available again to the nodes of the network and, preferably, at least one node of the network switches to use a transmission opportunity made available in this manner Thus, a better throughput and an efficient exploitation of the bandwidth provided by the medium is achieved.

In an embodiment, at least one node, for each signal heard on the medium during a transmission opportunity, determines if the signal is a commit signal or a data signal, wherein the commit signal request to the at least one other node of the network to enter in a receiving state, while the data signal includes information to be delivered to at least one another node.

If the detected signal includes only a data signal, associates a first age value to the node identifier in the list corresponding to the transmission opportunity during which the commit signal has been detected.

Otherwise, if the detected signal includes a commit signal, associates a second age value to the node identifier in the list corresponding to the transmission opportunity during which the data signal has been detected, wherein the second age value is greater than the first age value.

For each cycle in which a transmission opportunity is not used, reduces the age value of the corresponding node identifier, and when one of the age values reaches a respective threshold value, removes the corresponding node identifier from the list.

Thanks to this solution, it is possible to ensure the interoperability among nodes having different capabilities with limited risks of collision between transmissions.

In an embodiment, at least one node for each signal heard on the medium during a transmission opportunity:
determines if the signal is a commit signal or a data signal, wherein the commit signal request to the at least one other node of the network to enter in a receiving state, while the data signal includes information to be delivered to at least one another node.

If the detected signal includes only data signal, associates a first age value to the node identifier in the list corresponding to the transmission opportunity during which the data signal has been detected.

Then, after each transmission cycle increase a first counter, and when the first counter reaches a first threshold value, removes all the node identifiers associated with the first age value from the list.

Preferably, the at least one node, if the detected signal include a commit signal, associates a second age value to the node identifier in the list corresponding to the transmission opportunity during which the commit signal has been detected.

Then, after each transmission cycle increase the second counter, and when the second counter reaches a second threshold value, removes the all the node identifier from the list, the second threshold being greater than the first threshold.

Further preferably, the at least one node further:
listens to the medium for signals transmitted during a next transmission cycle;
update the list by adding each the node identifier detected, and
iterates the method according to one of the embodiments described above.

In an embodiment, the at least one node creates a second list of the node identifiers detected, which is a copy of the list.

For each signal heard on the medium during a transmission opportunity, determines if the signal is a commit signal or a data signal, wherein the commit signal request to the at least one other node of the network to enter in a receiving state, while the data signal includes information to be delivered to at least one another node.

If the detected signal includes only data signal, associates a first age value to the node identifier in the list corresponding to the transmission opportunity during which the data signal has been detected, wherein the first age value is greater than the second value.

Then, after each transmission cycle increase a first counter, and when the first counter reaches a first threshold value, removes all the node identifiers associated with the first age value from the list and from the second the list.

Preferably, the at least one node, if the detected signal include a commit signal, associates a second age value to the node identifier corresponding to the transmission opportunity during which the commit signal has been detected.

Then, after each transmission cycle increase the second counter, and when the second counter reaches a second threshold value, copy the content of the second list in the list and, further, removes the all the node identifier from the second list.

Further preferably, the least one node further:
listens to the medium for signals transmitted during a next transmission cycle;
update the list and the second list by adding each the node identifier detected, and iterates the any combination of the steps described above.

These embodiments, provide a solution that can be provided at lower layer of the OSI stack efficiently and in a cost-effective manner.

In a different aspect, the invention is directed to a method for dynamically allocating transmission opportunities to a plurality of nodes of a communication network.

Particularly, the transmission opportunities are cyclically repeated in a sequence of transmission cycles. Moreover, each node is connected to one same medium for sending and receiving data signals.

The method provides that at least one node listens to the medium for signals transmitted during a transmission cycle and detects the node identifiers associated with the nodes that used a respective transmission opportunity to transmit at least a signal.

Further, the node creates a list of the node identifiers detected, wherein the node identifiers are listed according to the order of the transmission opportunities in the transmission cycle, and associates an age information to each node identifier included in the list of the node identifiers.

Then, the node selects from the list an unused node identifier for transmitting in the corresponding transmission opportunity, and each transmission cycle increases at least a counter associated with at least one age information.

When the at least one counter reaches a threshold, the node deletes from the list each node identifier associated with said at least one age information.

In an embodiment, the at least one node listens to the medium for a transmission listening time from the start of the transmission opportunity associated with the selected node identifier.

If no signal is heard during the transmission listening time, uses the transmission opportunity associated with the selected node identifier.

Conversely, if a signal from another node is heard during the listening time, adds the currently selected node identifier to the list of detected nodes.

Further the node iterates the any combination of the steps described above until a data transmission is completed.

In an embodiment, the plurality of nodes includes at least one between:
- a first set of one or more nodes using a DPLCA transmission protocol, capable of transmitting commit signals and data signals, wherein the commit signal request to other nodes of the network to enter in a receiving state, while the data signal includes information to be delivered to at least one another node,
- a second set of one or more nodes using a PLCA transmission protocol, capable of transmitting commit signals and data signals or data signals only, and
- a third set of one or more nodes using a CSMA/CD transmission protocol, capable to transmit only data signals.

Advantageously, the at least one node belongs to the first set. Moreover, the node for each signal heard on the medium, determines if the signal is a commit signal or a data signal.

If the detected signal is a commit signal, sets to a first age value the age information associated to the node identifier corresponding to the transmission opportunity during which the commit signal has been detected.

Conversely, if the detected signal is a data signal, sets to a second age value the age information associated to the node identifier corresponding to the transmission opportunity during which the data signal has been detected.

Particularly, the first age value indicates a longer occupancy of the transmission opportunity than the second age value.

Thanks to the solutions above, it is possible to manage efficiently the allocation of transmission opportunities. Particularly, it is possible to allocate transmission opportunities/node identifiers at least as fast as other methods of node identifier allocation belonging to upper-layers (e.g. Link Layer Discovery Protocol—LLDP).

At the same time, these solutions ensure interoperability with CSMA/CD and PLCA nodes and without compromising network performance such as latency, throughput, fairness and EMC levels.

In a different aspect, the invention is directed to a method for transmitting data on a communication network.

The communication network includes a plurality of network nodes is connected to one same medium for sending and receiving data signals, and each node is associated with a node identifier.

Advantageously, nodes cyclically transmit data on the medium during a transmission cycle. Particularly, each node is allocated a transmission opportunity based on its node identifier.

The method provides that, during each transmission opportunity, a node:
- listens to the medium for signals transmitted during the transmission opportunity,
- stores in a memory area a node identifier associated to the transmission opportunity, and an aging information, wherein the aging information is the value of a timer that is started the first time a signal is detected during the transmission opportunity.

Advantageously, the node takes the lowest node identifier associated with:
- an aging information having a threshold value, or
- a transmission opportunity during which no signal has been heard.

In an embodiment, the aging information depends on the type of signal detected during the transmission opportunity.

Preferably, the aging information is greater if the detected signal is a signal request to other nodes of the network to enter in a receiving state, while the aging information is smaller if the detected signal is a data signal.

These and other advantages and aspects of the present invention will become clear and more readily appreciated from the following detailed description of the invention taken in conjunction with the accompanying drawings.

BRIEF DESCRIPTION OF THE DRAWINGS

The invention will be described below with reference to some not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

FIG. 4 is a schematic view of a list of node identifiers created by the nodes of the network according to the method of FIG. 3;

FIG. 5 is a sequence of transmission opportunity managed according to the method of FIG. 3;

FIG. 6 is a flowchart of a method of node identifier/transmission opportunities adjustment according to a second embodiment;

FIG. 7 is a sequence of transmission opportunity managed according to the method of FIG. 6;

FIGS. 9A, 9B and 9C are sequences of transmission opportunity managed according to the method of FIGS. 8A and 8B;

FIG. 10 is a schematic view of a list of node identifiers created by each one of the nodes of the network including an age information for each node identifier stored in the list according to a fourth embodiment;

FIG. 14 is a schematic view of a list of node identifiers created by each one of the nodes of the network including an age information for each node identifier stored in the list according to a fifth embodiment;

DETAILED DESCRIPTION

Figures 1, 2:
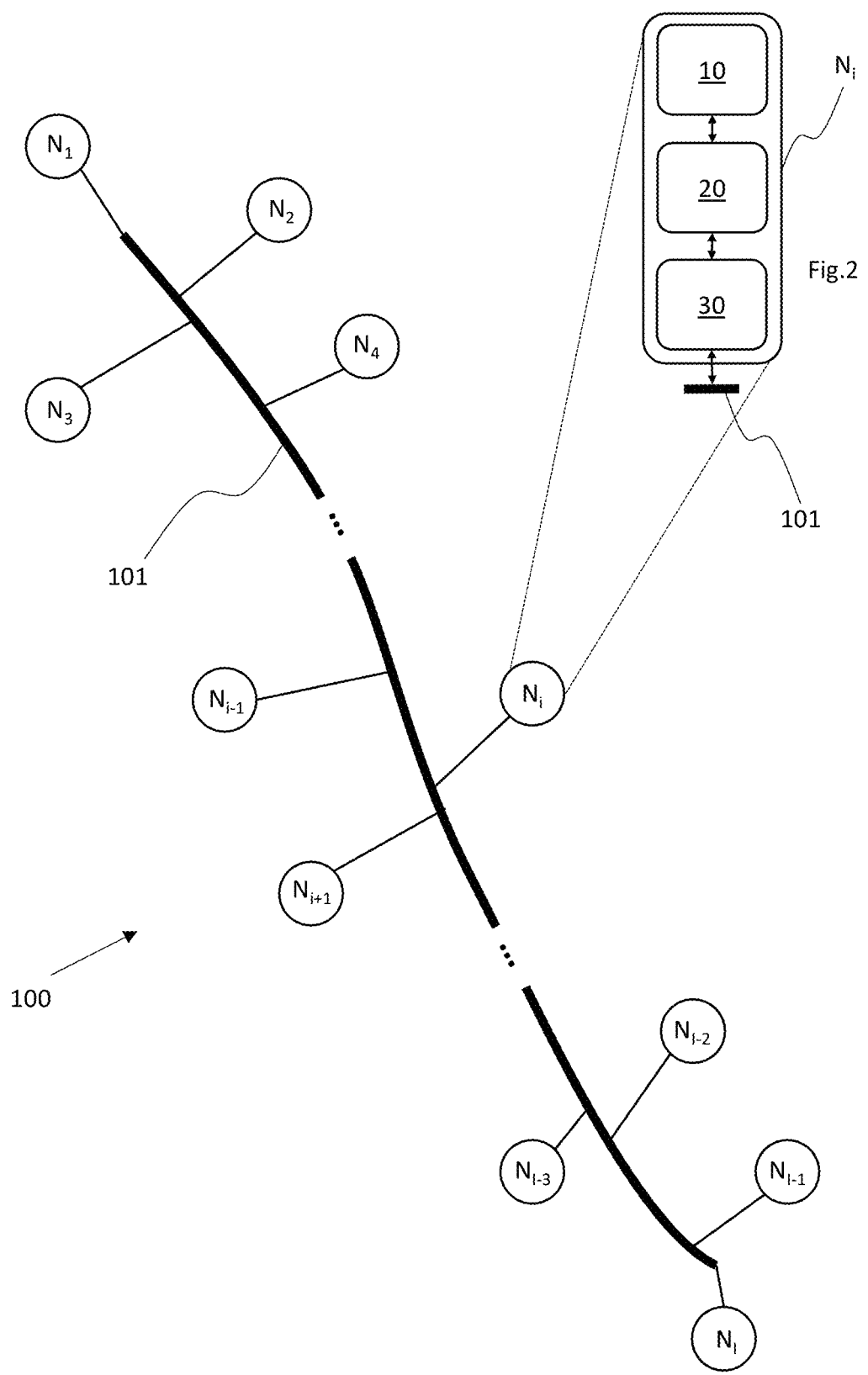
FIG. 1 is a block diagram of a communication network in which a method according to an embodiment is implemented.
FIG. 2 is a block diagram of a generic node of the network of FIG. 1.

While the invention is susceptible to various modifications and alternative constructions, some preferred embodiments are shown in the drawings and will be described in detail herein below.

It should be understood, however, that there is no intention to limit the invention to the specific disclosed embodiment but, on the contrary, the invention intends to cover all modifications, alternative constructions and equivalents that fall within the scope of the invention as defined in the claims.

The use of "for example", "etc.", "or" indicates non-exclusive alternatives without limitation, unless otherwise defined.

The use of "including" or "comprising" means "including, but not limited to", unless otherwise defined.

In the following description, signals and functions which are defined in IEEE Standard 802.3, like PLS (Physical Layer Signaling) data and commands, will be used in this specification with the meaning of the standard specification unless differently indicated.

As disclosed in IEEE Standard 802.3 the Physical Layer Collision Avoidance Reconciliation Sublayer (shortened PLCA RS) lies within Layer 1 of the OSI model. In the embodiments, the PLCA RS of at least a portion of the nodes of a considered network 100 includes a capability of dynamic allocation of node identifiers IDs, and is identified as D-PLCA RS in the following.

Modifications to the Ethernet protocols described here below aim at data transmission methods and node identifiers allocation methods that dynamically allocates transmit opportunities at proper times across a multi-drop network in order to allow a reliable data exchange among nodes of the network, reducing the probability of physical collisions on the medium.

An example of multidrop network 100 is illustrated in FIG. 1, wherein a plurality of devices or nodes $N_1$ to $N_I$—where I is a positive integer—exchange data over a medium 101, e.g. a twisted pair cable or an optical cable.

Nodes $N_1$-$N_I$ can be any type of computer devices that are able to connect to the medium 101. As an example, network 100 can be a network of sensors and actuators within a car, therefore nodes $N_1$-$N_I$ can be a power train control module, a throttle sensor, a manifold absolute pressure sensor, a mass airflow sensor, and the like.

As illustrated in FIG. 2, the generic node $N_i$ is provided with an access control module 10 for controlling access of the device to the medium, a transceiver module 30 for transmitting data over the medium 101, and a data exchange module 20 for exchanging data between the access control module 10 and the transceiver module 30. The access control module 10, also shortened MAC module, implements the functions of the MAC sublayer and is configured to transmit data to the data exchange module 20 when it receives an information that no data is present on the medium 101. The transceiver module 30 implements the functions of the PHY sublayers and is configured to transmit data on the medium 101 each time it receives data from the data exchange module 20.

The data exchange module 20 implements the functions of the PLCA RS. Particularly, in the embodiments described below, the exchange modules 20 of at least of part of the nodes $N_1$-$N_I$ implement the functions of the D-PLCA RS.

In a first embodiment, all the nodes $N_1$-$N_I$ network 100 include D-PLCA capabilities and the node $N_1$ is assigned the role of coordinator node for the network 100 and, thus, the node identifier ID with the lowest value, e.g. ID=0 or $ID_0$ in the following. In other words, the coordinator node of the network 100, in addition to perform the common operations of any other node of the network 100, periodically transmits a beacon signal BEACON, which signals the start of a transmission cycle C thus synchronizing the node of the network 100.

Figure 3:
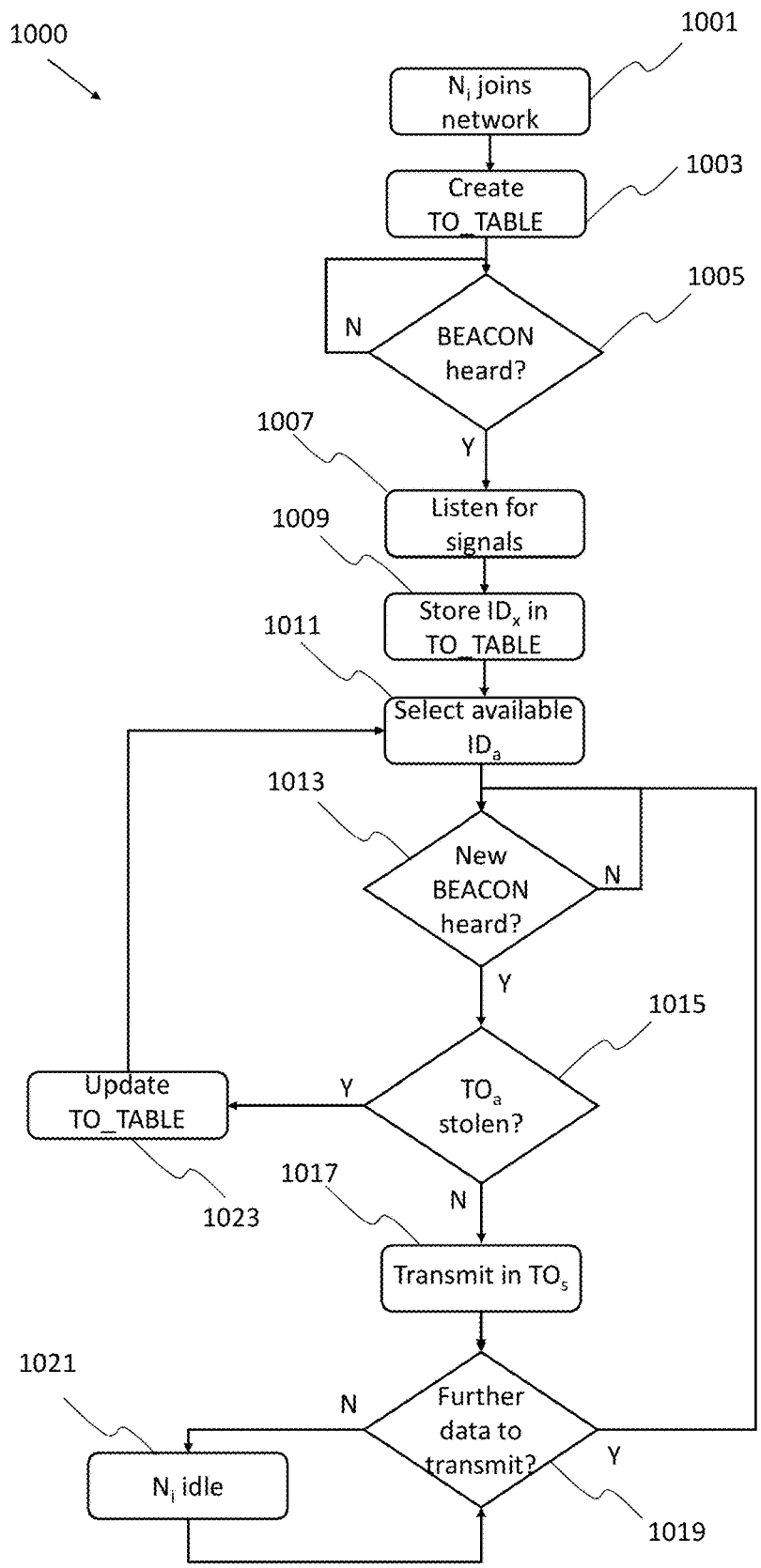
FIG. 3 is a flowchart of a first method for allocating node identifier/transmission opportunities according to a first embodiment.

In this embodiment, a first dynamic allocation method 1000 of which FIG. 3 is a flowchart includes the following steps.

When the generic node $N_i$—having DPLCA capabilities—joins the network 100 (step 1001)—i.e. the node is connected to the medium 101—, the former starts a process for maintaining a list transmission opportunity TO_TABLE of the node identifiers IDs used by the other nodes $N_1$-$N_I$ (step 1003)—schematically shown in FIG. 4. The list TO_TABLE provides the knowledge of used transmission opportunities $TO_S$—i.e. transmission time windows. In other words, each node $N_1$-$N_I$ of the network maintains a list of the identifiers ID used by the other nodes $N_1$-$N_I$ of the network 100 for transmitting during corresponding transmission opportunities $TO_S$. Advantageously, the node identifiers $ID_x$ in the list TO_TABLE are arranged according to a position in a time sequence of the transmission opportunities $TO_x$ within each transmission cycle C—with 0≤x≤X; X positive integer, e.g. X=7, 63, 127 or 256. Preferably, the node identifiers $ID_x$ include a numerical value that corresponds to a numerical value of the corresponding transmission opportunities $TO_x$, which indicates the position of the transmission opportunities $TO_x$ within each transmission cycle C.

Then, the node $N_i$ listen for a beacon signal BEACON transmitted over the network 101 by the coordinator node (decision step 1005) and, when the beacon signal BEACON is detected (output branch Y of step 1005) listen for signals, preferably commit signals COMMIT, transmitted over the network (step 1007) in a whole transmission cycle C.

In detail, a commit signal COMMIT claims the transmission opportunity $TO_N$ during which is transmitted and asks the other nodes $N_1$-$N_I$ of the network 100 to move to a receiving state. Moreover, the transmission cycle C is a sequence of transmission opportunities TOs included between two consecutive beacon signals BEACON.

Particularly, each node $N_1$-$N_I$ with D-PLCA capabilities is configured for transmitting a commit signal COMMIT before—or alternatively after—the transmission of a data signal or simply data D—e.g. one or more data packets— during a transmission opportunity $TO_x$ within a transmission cycle C, associated with a respective node identifier $ID_x$.

For each commit signal COMMIT detected (output branch Y of step 1007), the node $N_i$ stores in the list TO_TABLE the node identifier $ID_x$ corresponding to the transmission opportunity $TO_x$ in which a commit signal has been detected (step 1009).

The node $N_i$, then, selects an available node identifier $ID_a$ i.e., a node identifier $ID_s$ that is not included in the list TO_TABLE (step 1011). Preferably, the node $N_i$ selects the node identifier $ID_{L+1}$ next to the last node identifier $ID_L$ only if there are not any other available node identifiers $ID_x$ with a lower value (i.e., included between $ID_0$ and $ID_{L-1}$).

The node $N_i$ monitors the medium 101 in order to detect a next a new beacon signal BEACON (decision step 1013)—i.e., the start of a new transmission cycle C. When the new cycle C of transmission opportunities $TO_x$ starts (output branch Y of step 1013), the node Ni waits the transmission opportunity $TO_a$ associated with the selected node identifier $ID_a$, and listens for a commit signal COMMIT transmitted by another node $N_1$-$N_I$ of the network 100 for a transmission opportunity TO listening time $t_1$ (decision step 1015).

If the node $N_i$ does not hear any commit signal COMMIT over the medium 101 during the transmission opportunity TO listening time $t_1$ (output branch N of step 1015), the node $N_i$ transmits a commit signal COMMIT and data D over the medium (step 1017). Then, the node $N_i$ checks if has to transmit new data (decision step 1019).

When no further data is to be transmitted (output branch N of step 1019), the node $N_i$ preferably, enters one among an idle state, a stand-by state and a low power state (step 1021), and waits for new data to transmit—i.e. operation returns to step 1019.

When new data is to be transmitted (output branch Y of step 1019), the node $N_i$ tries to transmit again in the transmission opportunity $TO_s$ in the next cycle C by iterating the method 1000 from the step 1013.

Conversely, if the node $N_i$ does hear a commit signal COMMIT over the medium 101 during the transmission opportunity $TO_s$ listening time $t_1$—i.e., the transmission opportunity $TO_s$ is stolen by another node $N_1$-$N_I$ (output branch Y of step 1015), the node $N_i$ updates the list TO_TABLE by inserting the previously selected node identifier $ID_s$ (step 1023). Then, the node $N_i$ selects a new node identifier $ID_{a'}$ among the available node identifiers by iterating the method from step 1011.

With reference to FIG. 5, a sequence of transmission cycles C1-C4 is schematically shown in order to provide an example of the execution of the method 1000. It is considered that nodes $N_{i-1}$, $N_i$ and $N_{i+1}$ join the network 100 together—i.e., within a same time period. For a first transmission cycle C1, i.e. after having detected a first beacon signal BEACON—B in FIG. 5, the nodes $N_{i-1}$, $N_i$ and listen for commit signal COMMIT transmitted over the medium 101, but they hear none—i.e., the transmission opportunities $TO_{1-7}$ are unused. Accordingly, all the nodes $N_{i-1}$, $N_i$ and $N_{i+1}$, select the first node identifier $ID_1$, but node $N_i$ is the first to transmit the commit signal COMMIT over the medium 101 during a second cycle C2. Nodes $N_{i-1}$ and $N_{i+1}$ hear the commit signal COMMIT from $N_i$, and both the nodes $N_{i-1}$ and $N_{i+1}$ select the second node identifier $ID_2$. During a third cycle C3 they both start transmitting after the expiry of listening time of the other node and $N_{N+1}$ and $N_{i-1}$. Accordingly, no one between the node $N_{i+1}$ and $N_{i-1}$ is able successfully transmit data during the third cycle C3. Moreover, none of the other nodes $N_1$-$N_I$ of the network 100 registers in its list TO_TABLE the occupancy of the $TO_2$ associated with the second node identifier $ID_2$. Finally, during a fourth transmission cycle C4, the node $N_{i-1}$ is the first to transmit the commit signal COMMIT over the medium 101. Thus, node $N_{i+1}$ renounces to the second node identifier $ID_2$ and selects the next node identifier $ID_3$. Therefore, from the next cycle (not shown) all the nodes $N_{i-1}$, $N_i$ and $N_{i+1}$, are able to transmit data over the medium 101 without provoking collision one with the others—i.e., the nodes converge to a stable mode of operation without implementing any detecting collision procedure.

In a second embodiment, the coordinator node $N_1$—i.e., the node associated with the node identifier $ID_0$—is configured to dynamically adjust the number of transmission opportunities $TO_x$ in each transmission opportunity cycle C based upon a number of nodes $N_1$-$N_I$ actively transmitting data through the network 100.

In particular, the coordinator node $N_1$ is configured for performing a transmission opportunities adjustment method 2000—of which FIG. 7 is a flowchart—including the following steps. The coordinator node $N_1$ verifies the number of allocated node identifiers ID or, similarly the number of used transmission opportunities TO (decision step 2001). For example, the coordinator node $N_1$ verifies if its list TO_TABLE is full, i.e. all the available node identifiers are allocated. Alternatively, the coordinator node $N_1$ verifies if a node $N_2$-$N_I$ of the network 100 selects the last available node identifier $ID_X$. As a further alternative, the coordinator node is configured to detect the number of transmission opportunities TO per transmission cycle C in which a signal has been successfully transmitted, or counts the number of commit signal COMMIT transmitted over the medium 101 during each transmission cycle C.

If the number of allocated node identifiers is lower than the maximum number of node identifiers plcanodeCount (output branch N of step 2001), the number of node identifiers plcaNodeCount and, accordingly, of transmission opportunities TO is maintained (step 2003) and the execution of the method is reiterated from step 2001.

If the number of allocated node identifiers is equal to the maximum number of node identifiers plcaNodeCount (output branch N of step 2003), the maximum number of node identifiers plcaNodeCount and, accordingly, of transmission opportunities TO are each increased by a predetermined number, for example one unit (step 2005) and the execution of the method is reiterated from step 2001.

Optionally, the coordinator node $N_1$ is configured to monitor the use of the penultimate transmission opportunity $TO_{X-1}$. When no signals are transmitted in the penultimate transmission opportunity $TO_{X-1}$ for a predetermined number of transmission cycles, the maximum number of node identifiers plcaNodeCount and, accordingly, of transmission opportunities TO is decreased by one unit during the next transmission cycles.

With reference to FIG. 7, an example of the execution of the method 2000 is provided. During a first cycle C1 of transmission opportunities $TO_S$, the nodes $N_i$ and $N_{i+1}$ joins the network. The current number of node identifiers plcaNodeCount is set to eight and all node identifiers ID0-6 but one are used, therefore both nodes $N_i$ and $N_{i+1}$ select the last remaining node identifiers ID7. The coordinator node $N_1$ detects that the last remaining node identifiers ID7 has not been used, and does not change number of node identifiers plcaNodeCount. During the second cycle C2, the node $N_i$ transmits the commit signal COMMIT before the other node $N_{i+1}$, which has to skip the second cycle C2 since there are not any node identifiers ID available. In this case, the coordinator node $N_1$ detects that all the available node identifiers ID0-7 are used, and increases the number of node identifiers plcaNodeCount by one unit. Accordingly, during the third cycle C3 the node $N_{i+1}$, detects that a new transmission opportunity TO is available and selects the corresponding available node identifier IDB. Thus, the node $N_{i+1}$ can perform a transmission from the subsequent next cycles of transmission opportunities $TO_S$.

In a third embodiment, one or more nodes of the network 100—having DPLCA capabilities—are eligible to operate as coordinator nodes, e.g. in order to grant network reliable the execution of the method in case of a malfunction of an active coordinator node or when the latter is powered off/unplugged from the network. For example, two to all the nodes $N_1$-$N_I$ can be set as eligible to operate as the coordinator node of the network.

Figure 8A:
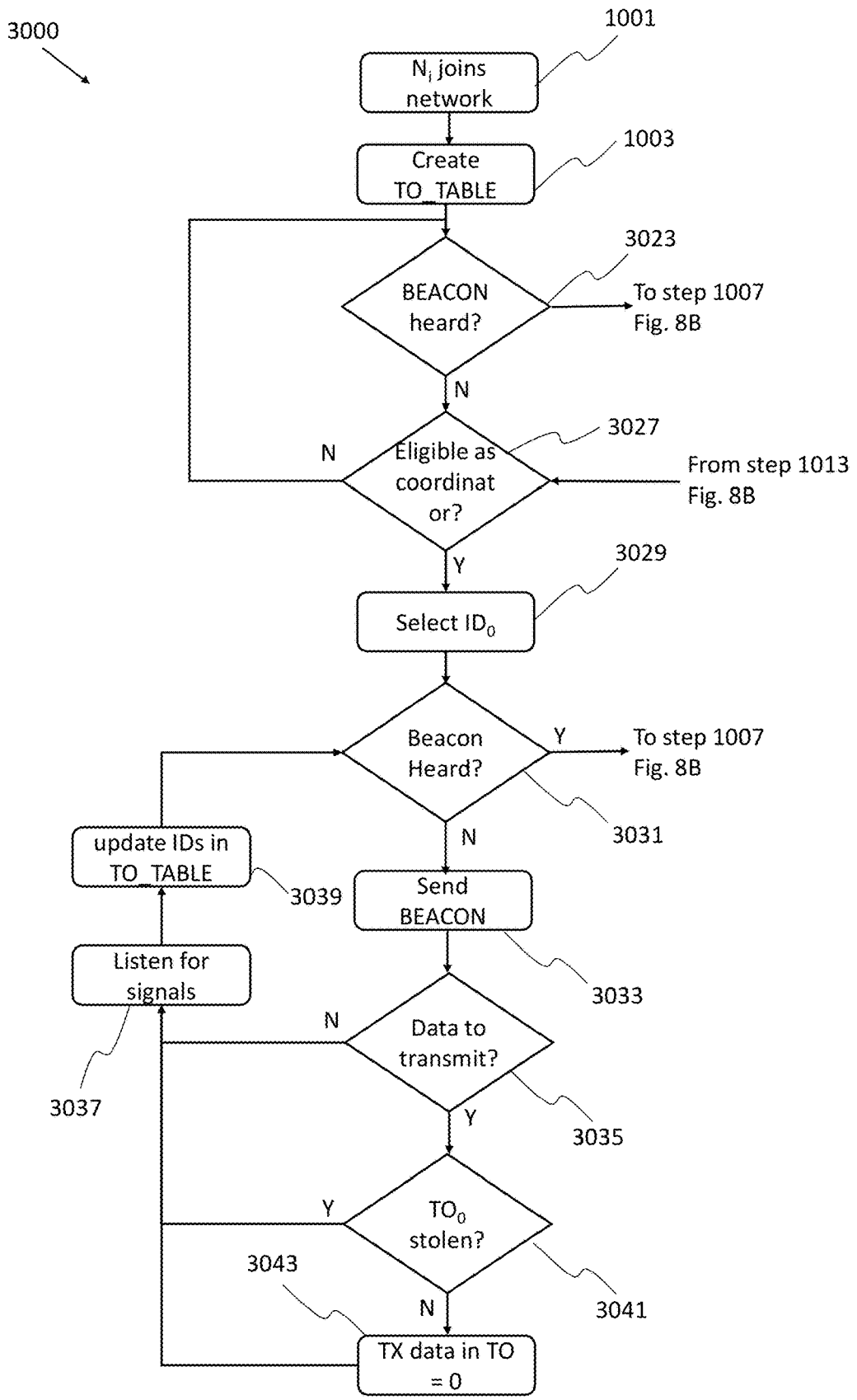
FIGS. 8A and 8B are a flowchart of a second method for allocating node identifier/transmission opportunities according to a third embodiment.
Figure 8B:
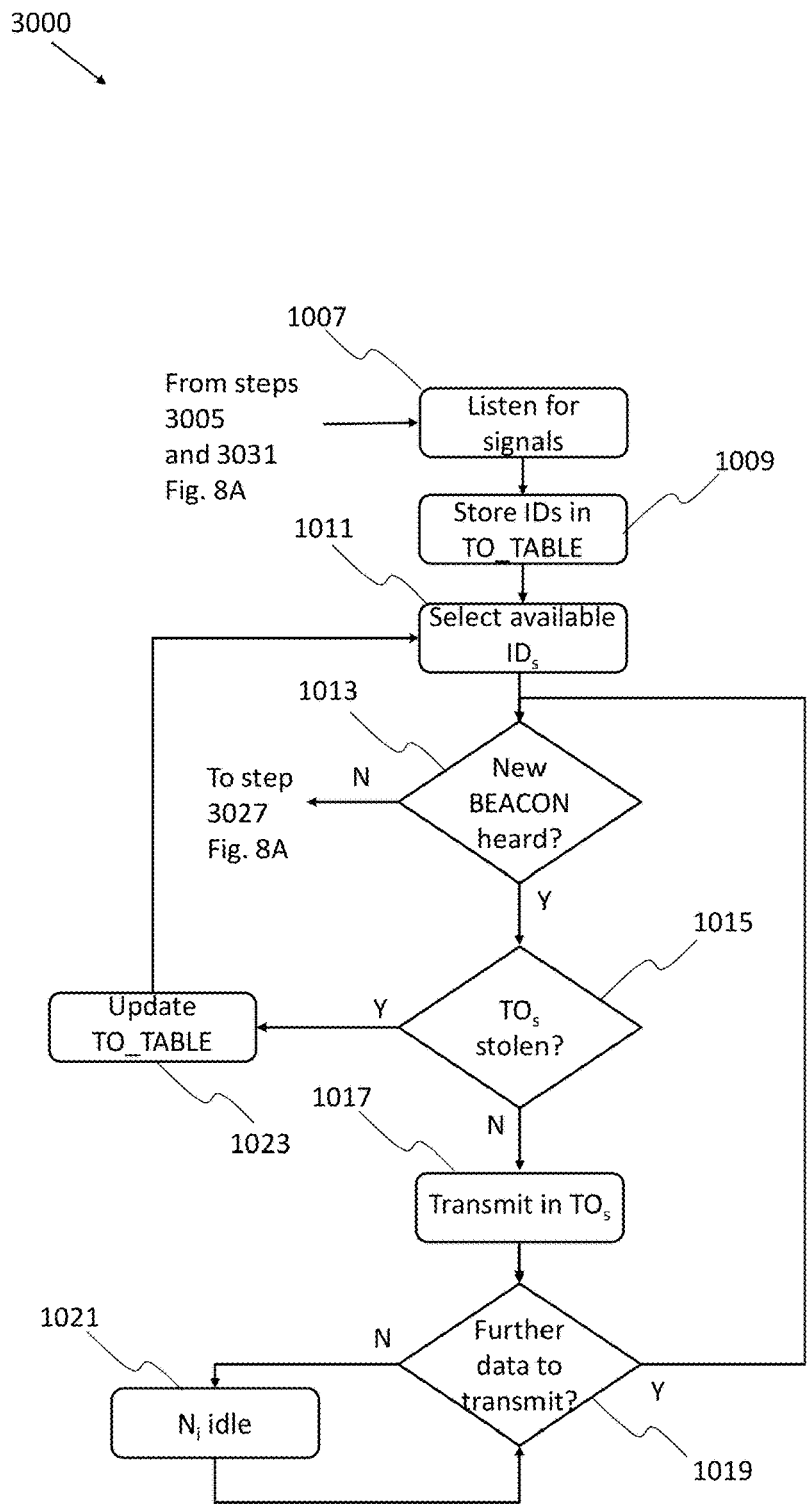

Particularly, the generic node $N_i$ of the network 100 eligible for operating as coordinator nodes execute a second dynamic allocation method 3000—of which FIGS. 8A and 8B are a flowchart—that differs from the first dynamic allocation method 1000 in what follows, wherein same numeral references identify similar steps.

When the generic node $N_i$ joins the network 100 (step 1001) starts a process for maintaining the list TO_TABLE (step 1003).

Then, the node $N_i$ listen for a beacon signal BEACON transmitted over the network 101 for a beacon listening time $t_2$ (decision step 3023). If the beacon signal BEACON is detected during the beacon listening time $t_2$ (output branch Y of step 3023) the method 3000 includes the steps 1007-1023 described above and herein omitted for the sake of brevity.

If the node $N_i$ does not detect a beacon signal BEACON during the beacon listening time $t_2$ (output branch N of step 1023), optionally, the node $N_i$ verifies to be entitled to select the coordinator node identifier $ID_0$ (decision step 3027). In the negative case (output branch N of step 3027), the execution of the method is reiterated from step 3023.

If, instead, the node $N_i$ is entitled to use the coordinator node identifier $ID_0$ (output branch Y of the step 3027), the node $N_i$ selects the coordinator node identifier $ID_0$ (step 3029).

Then, the node $N_i$ listen for a beacon signal BEACON transmitted by another node $N_1$-$N_I$ of the network 100 during a further beacon listening time $t_3$ (decision step 3031). If the node $N_i$ does not hear any beacon signal BEACON or a commit signal COMMIT over the medium 101 during the further beacon listening time $t_3$ (output branch N of step 3031), the node $N_i$ transmits a beacon signal BEACON over the medium (step 3033).

Then, the node $N_i$ checks if has to transmit data (decision step 3035). When no data is to be transmitted (output branch N of step 3035), the node $N_i$ listen for signals, preferably commit signals COMMIT, transmitted over the network (step 3037) and populate the list TO_TABLE based on the commit signals COMMIT transmitted over the medium 101 during the current transmission cycle (decision step 3039). Then, the node $N_i$ tries to operate as coordinator node again by iterating the method 3000 from step 3031.

Conversely, when the node $N_i$ has to transmit data (output branch Y of step 3035), the node Ni listens for a commit signal COMMIT transmitted by another node $N_1$-$N_I$ of the network 100 for a transmission opportunity listening time $t_1$ the first transmission opportunity $TO_0$ (decision step 3041).

If the node $N_i$ does not hear any commit signal COMMIT over the medium 101 during the transmission opportunity TO listening time $t_1$ (output branch N of step 1015), the node $N_i$ transmits a commit signal COMMIT and data D over the medium during the first transmission opportunity $TO_0$ (step 3043). Then, the execution of the method 3000 proceeds to step 3037 described above.

Conversely, if the node $N_i$ hears a beacon signal BEACON during the further beacon listening time $t_3$ (output branch Y of step 3031), the node $N_i$ reverts to operate as a common node of the network 100, with the execution of the method 3000 that proceeds to step 1007.

Preferably, in step 1013—instead as waiting simply for a beacon signal BEACON, as described in step 1013 of method 1000—the node $N_i$ listen for a beacon signal BEACON transmitted by another node $N_1$-$N_I$ of the network 100 during the beacon listening time $t_3$ (decision step 1013). If the node $N_i$ hears a beacon signal BEACON (output branch Y of step 1013) the method 3000 proceeds at step 1015 with the node Ni that tries to transmit with the same node identifier $ID_a$ again as described above. If, else, the node $N_i$ does not hear a beacon signal BEACON within the beacon listening time $t_3$ (output branch N of step 1013) the method 3000 proceeds at step 3027 with the node $N_i$ that tries to select the coordinator node identifier $ID_0$.

In summary, the generic node $N_i$ automatically self-assign the role of coordinator node, if needed, and operates as coordinator node, until another node $N_1$-$N_I$ of the network 100 steals the coordinator role or the node $N_i$ malfunctions, is powered down or is unplugged.

With reference to FIGS. 9A to 9C, an example of the dynamic allocation of the coordinator node according the method 3000 is provided.

FIG. 9A, shows an example in which three nodes $N_{i-1}$, $N_i$ and $N_{i+1}$, are eligible to operate as coordinator nodes. In this case, node $N_i$ is able to transmit the beacon signal BEACON before nodes $N_{i-1}$ and $N_{i+1}$ thus initiating a first cycle C1 of transmission opportunities $TO_S$. Accordingly, nodes $N_{i-1}$ and $N_{i+1}$, renounce to operate as coordinator nodes and from a second cycle C2 will select a node identifier ID in order to transmit over the network 100 as common nodes.

In the example of FIG. 9B, the nodes $N_{i-1}$, $N_{i+1}$, try to take the role of coordinator node by transmitting a beacon signal within a same time period, thus preventing any node $N_1$-$N_I$ of the of the network 100 to successfully detect a beacon signal BEACON. Then, the node $N_i$ is able to transmit the beacon signal BEACON before nodes $N_{i-1}$ and $N_{i+1}$, thus initiating a first cycle C1. Accordingly, nodes $N_{i-1}$, and $N_{i+1}$, renounce to operate as coordinator nodes as described above.

In FIG. 9C, the three nodes $N_{i-1}$, $N_i$ and $N_{i+1}$, repeatedly try to take the role of coordinator node by transmitting a beacon signal within a same time period, thus preventing any node $N_1$-$N_I$ of the of the network 100 to successfully detect a beacon signal BEACON. This situation ends when one of the three nodes $N_{i-1}$, $N_i$ and $N_{i+1}$-$N_i$ in the example—is able to transmit a beacon signal BEACON before the other nodes $N_{i-1}$ and $N_{i+1}$.

Figure 10:
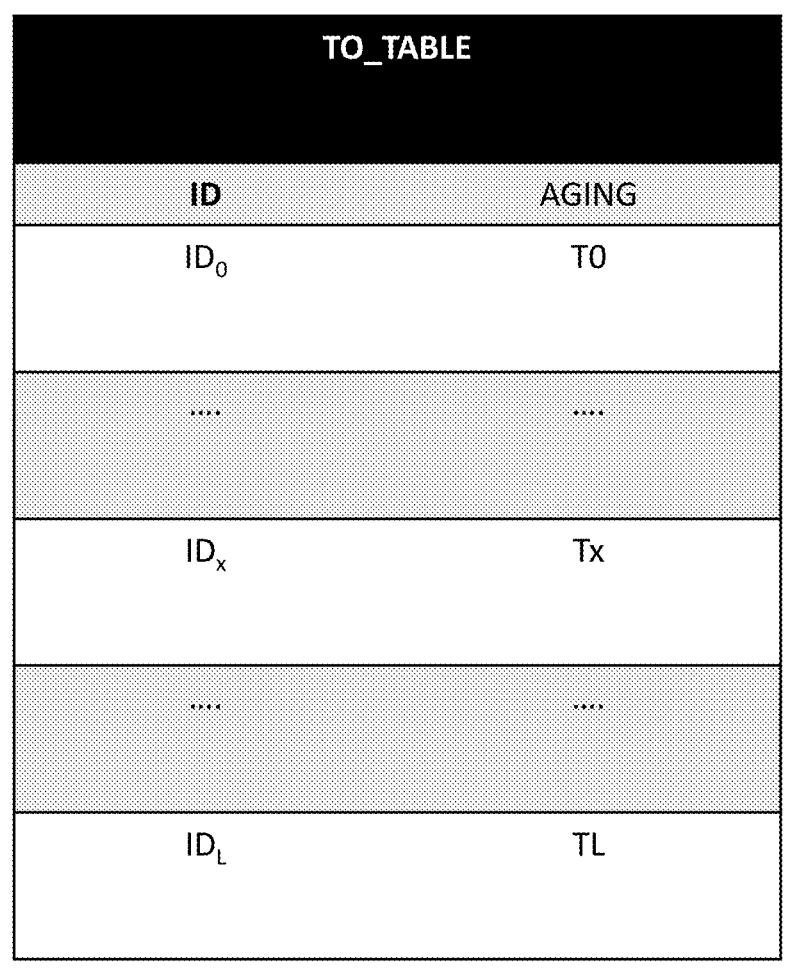
Figure 11:
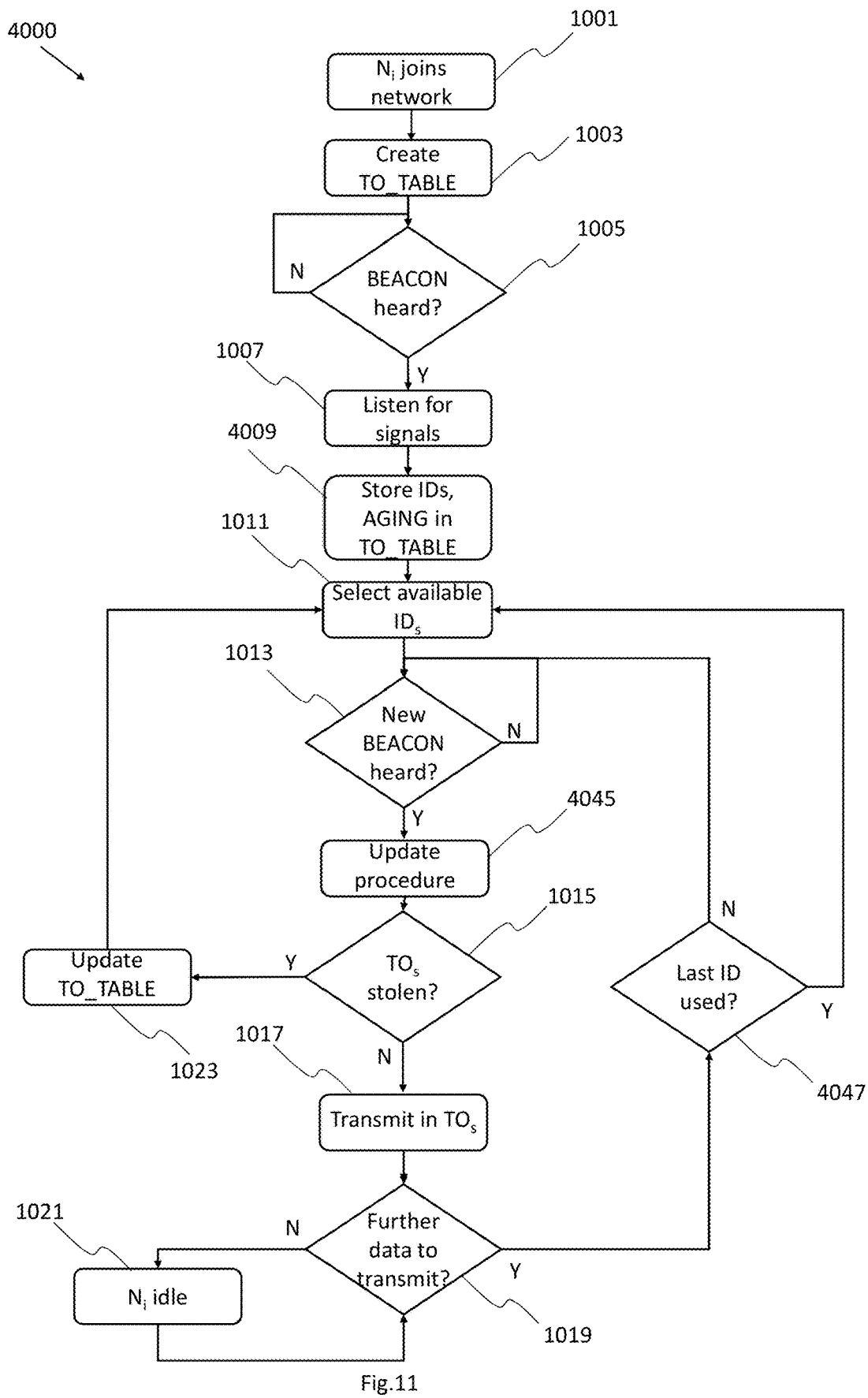
FIG. 11 is a flowchart of a third method for allocating node identifier/transmission opportunities according to the fourth embodiment.

In a fourth embodiment, the list TO_TABLE of the nodes $N_1$ to $N_I$ includes an age information AGING, associated with each entry of a used node identifier ID—as schematically shown in FIG. 10. Preferably, the age information AGING includes a age value, e.g. a counter, a predetermined value or an alphanumerical string In this case, the generic node $N_i$ of the network 100 executes a third dynamic allocation method 4000—of which FIG. 11 is a flowchart. The method 4000 differs from the first dynamic allocation method 1000 in what follows, wherein same numeral references identify similar steps.

The third dynamic allocation method 4000 includes all the steps 1001-1007 and 1011-1023 described above and which description is herein omitted for the sake of brevity. According to method 4000, the node $N_i$ stores in the list TO_TABLE the node identifier ID corresponding to the transmission opportunity TO in which the commit signal has been detected (as per step 1009) and also associates an age information AGING to the node identifier ID (step 4009A). Preferably, each node identifier ID is initially associated with a respective initial age information AGING—e.g., indicating a low or young age.

Figure 12:
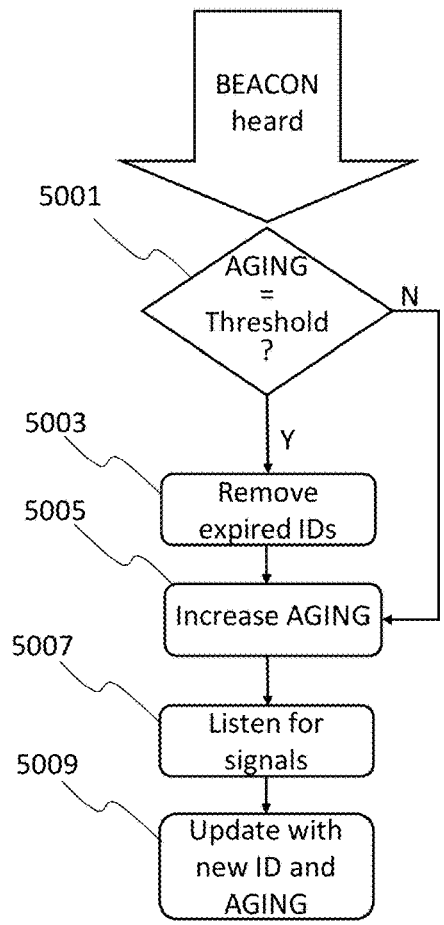
FIG. 12 is a flowchart of a list update procedure executed by third method of FIG. 11.

In addition, the method 4000 includes after step 1013 that the node $N_i$ executes a list update procedure 5000 (step 4045)—of which FIG. 12 is a flowchart.

In detail, the procedure 5000 is triggered by the detection of a beacon signal BEACON at step 1013 of method 4000.

Initially, the node Ni verifies whether the age information AGING of each node identifier $ID_x$ included in the list TO_TABLE has reached a threshold value (decision step 5001).

If the age information AGING of one or more node identifiers has reached the threshold (output branch Y of step 5001), the node $N_i$ removes from the list TO_TABLE any one or more node identifiers $ID_x$ which the age information AGING has reached the threshold (step 5003).

Next, the age of each node identifiers $ID_x$ still in the list TO_TABLE is increased (step 5005). For example, increasing the age is executed by increasing/decreasing an age value and/or changing a label included in the age information AGING.

Then, the node $N_i$ listens for signals, preferably commit signals COMMIT, transmitted over the network (step 5007), and updates the list TO_TABLE by inserting the node identifier $ID_x$ corresponding to the transmission opportunity $TO_x$ in which a commit signal has been detected and a respective age information AGING (step 5009).

Back to method 4000, when the node $N_i$ has new data to transmit (output branch Y of step 1019), the node $N_i$ verifies if its selected node identifier $ID_a$ is the last available node identifier $ID_L$ based on the list TO_TABLE updated by the procedure 5000 (decision step 4047). In the negative case (exit branch N of step 4047), the node $N_i$ tries to use the selected node identifier $ID_a$ again by iterating the method 4000 from step 1013. On the contrary, if selected node identifier $ID_a$ is the last available node identifier $ID_L$ one or more node identifiers $ID_x$ are available (exit branch Y step 4047), the node $N_i$ selects a new code identifier $ID_{a''}$ among the one or more node identifiers $ID_x$ now available, by iterating the execution of the method 4000 from step 1011.

Figure 13A:
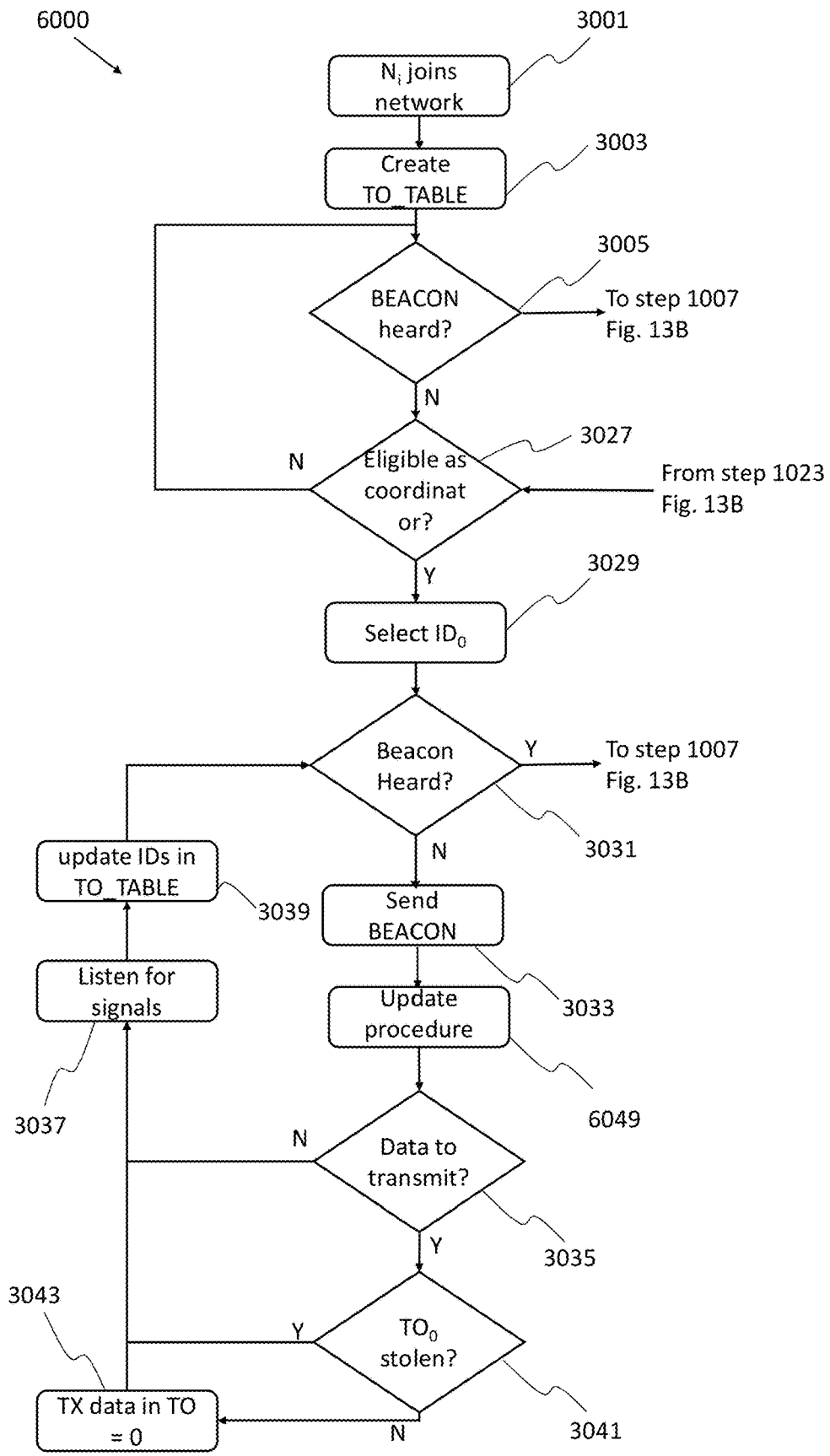
FIGS. 13A and 13B are a flowchart of a fourth method for allocating node identifier/transmission opportunities further according to the fourth embodiment.
Figure 13B:
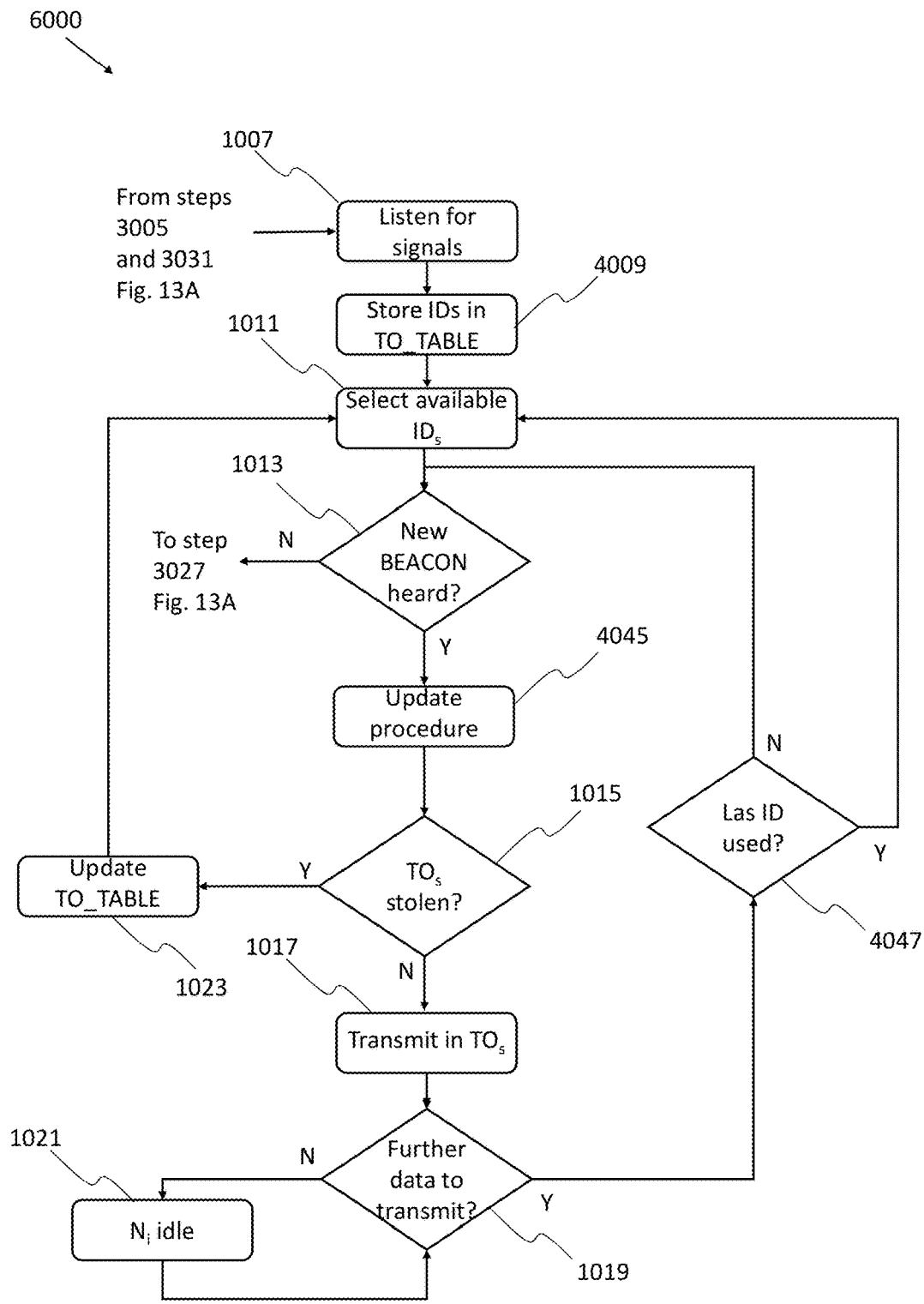

Alternatively or in addition, also in this case a set of one or more nodes N1-N1 of the network 100, including DPLCA capabilities, is eligible to operate as coordinator node and, thus, execute a fourth dynamic allocation method 6000—of which FIGS. 13A and 13B are a flowchart.

The fourth dynamic allocation method 6000 includes all the steps of the third dynamic allocation method described above and which description is herein omitted for the sake of brevity. Further, fourth dynamic allocation method 6000 includes all the steps of the second dynamic allocation method 3000 described above and which description is herein omitted for the sake of brevity.

In addition, the method 6000 includes, after that the node $N_i$ has sent a beacon signal BEACON in step 3033, that the node $N_i$ executes the list update procedure 5000 described above (step 6049).

In a fifth embodiment, the network 100 includes a subset of the nodes $N_1$-$N_I$ that possess only PLCA and/or CSMA/CD capabilities. In detail, nodes with CSMA/CD capabilities only transmit data D, while nodes with PLCA capabilities only transmit data D or commit signal COMMIT and data D if statistically configured.

In this case, the nodes $N_i$ having DPLCA capabilities are configured to assign a different age information AGING to a node identifier $ID_x$ in the list TO_TABLE—as shown in FIG. 14—based on whether is detected a commit signal COMMIT or only data D during the corresponding transmission opportunity $TO_x$.

Figure 15:
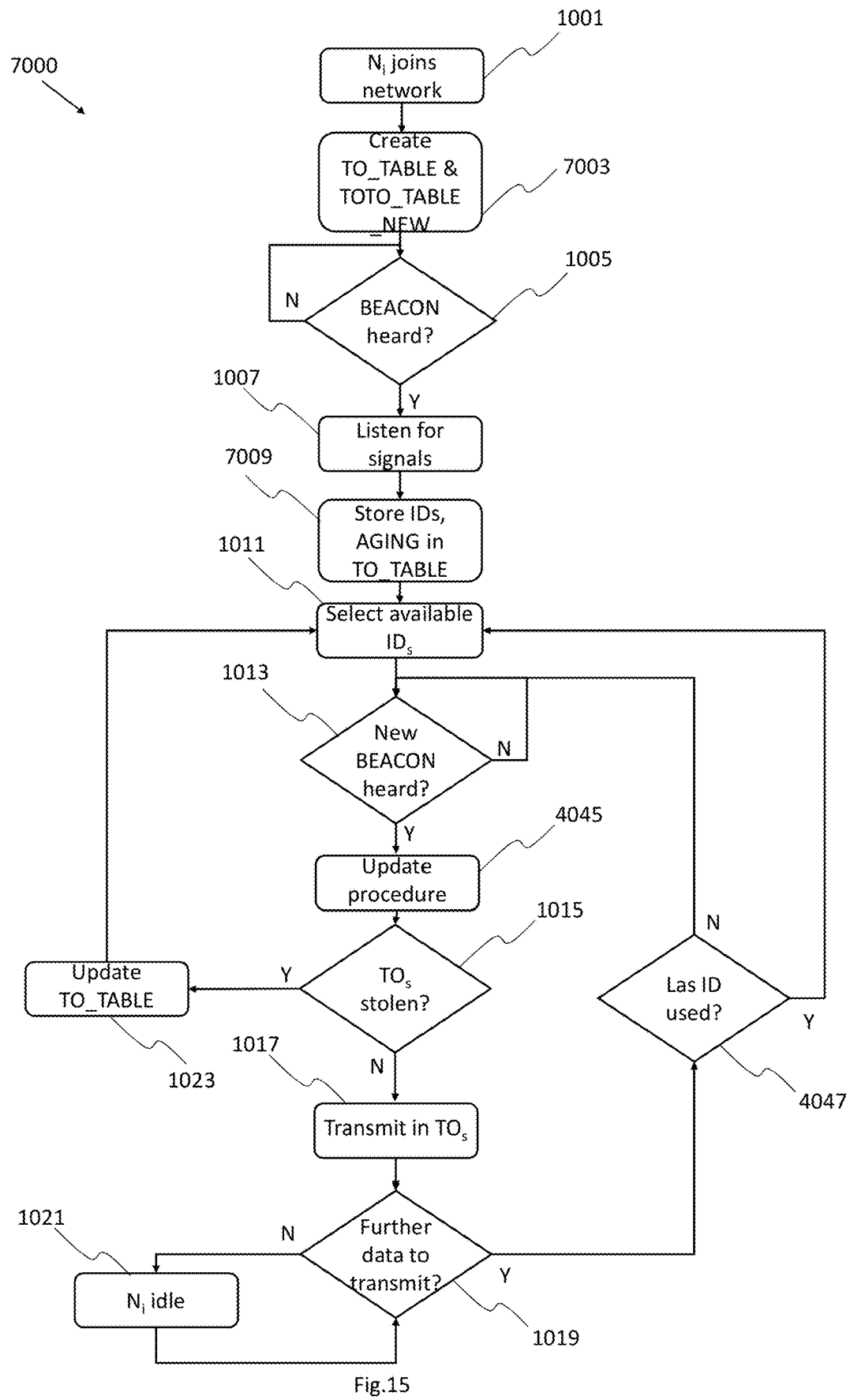
FIG. 15 is a flowchart of a fifth method for allocating node identifier/transmission opportunities according to the fourth embodiment.

For example, a fifth dynamic allocation method 7000—of which FIG. 15 is a flowchart—includes all the steps of the third dynamic allocation method 4000 described above—which description is herein omitted for the sake of brevity—for the following exceptions The node $N_i$, creates a first list TO_TABLE and a second list TO_TABLE_NEW (step 7003) instead of a single list TO_TABLE as described in step 1003.

Further, in a step 7009 substituting step 4009, the node $N_i$ assigns to a node $ID_x$ an age information AGING including a first value SOFT if only data D is detected during the corresponding transmission opportunity $TO_x$ or a second value HARD if a commit signal COMMIT is detected during the corresponding transmission opportunity $TO_x$ (step 7009).

Figure 16A:
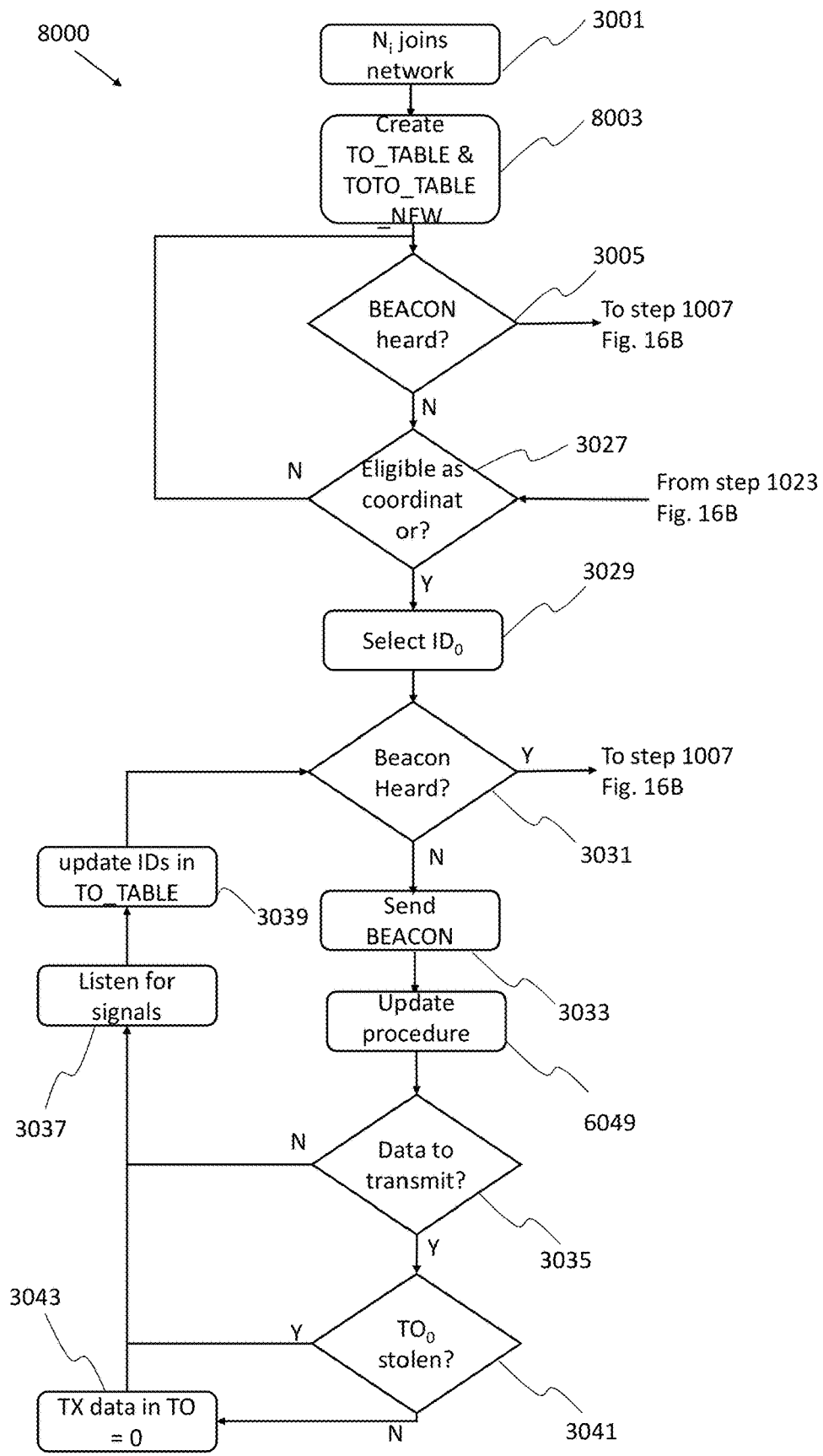
FIGS. 16A and 16B are a flowchart of a sixth method for allocating node identifier/transmission opportunities further according to the fourth embodiment.
Figure 16B:
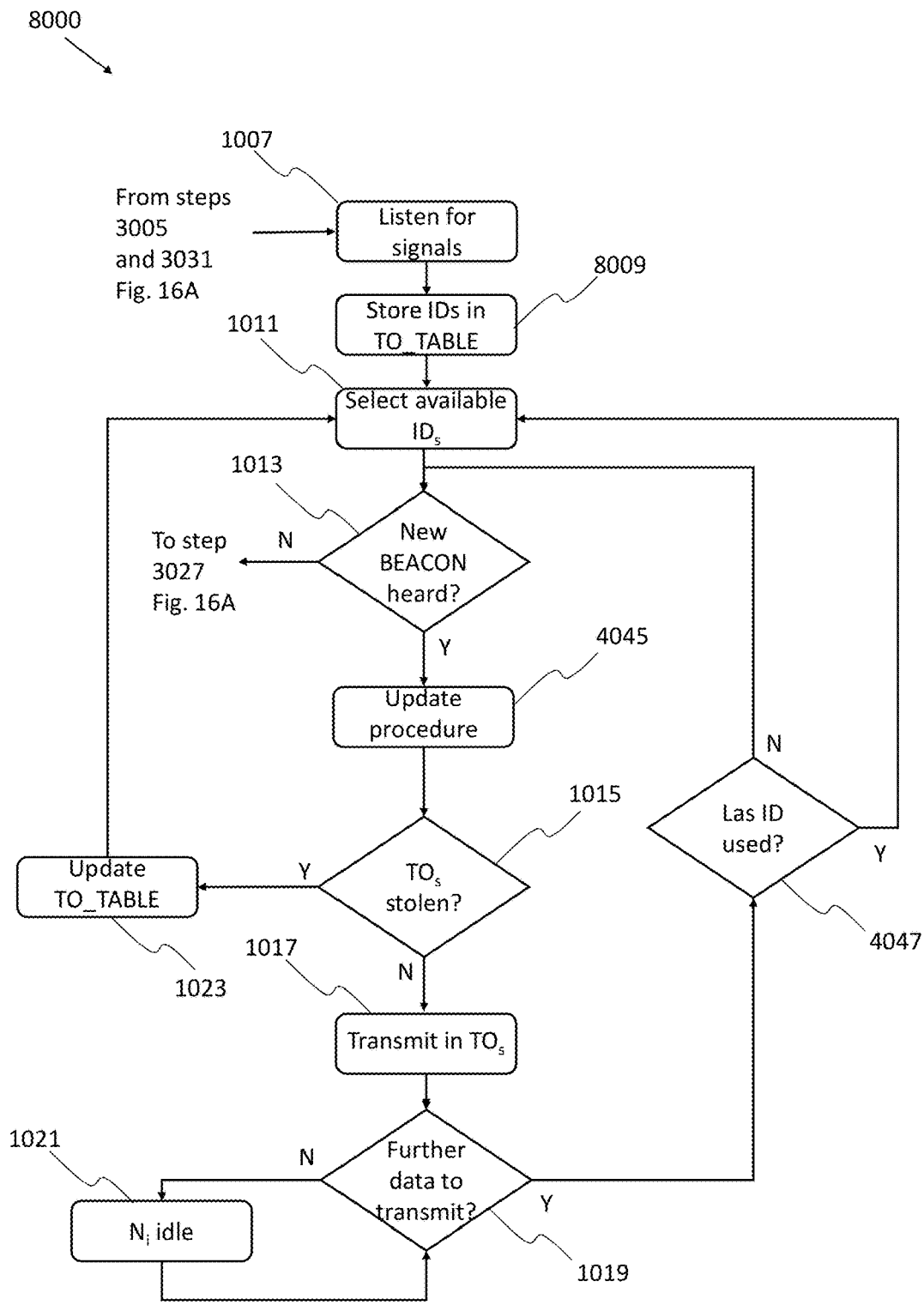

Similarly, a sixth dynamic allocation method 8000—of which FIGS. 16A and 16B are a flowchart—includes all the steps of the fourth dynamic allocation method 6000 described above—which description is herein omitted for the sake of brevity—for the following exceptions.

The node $N_i$, creates a first list TO_TABLE and a second list TO_TABLE_NEW (step 8003) instead of a single list TO_TABLE as described in step 1003.

Further, in a step 8009 substituting step 4009, the node $N_i$ assigns to a node $ID_x$ an age information AGING including the first value SOFT if only data D is detected during the corresponding transmission opportunity $TO_x$ or the second value HARD if a commit signal COMMIT is detected during the corresponding transmission opportunity $TO_x$ (step 8009).

Figure 17:
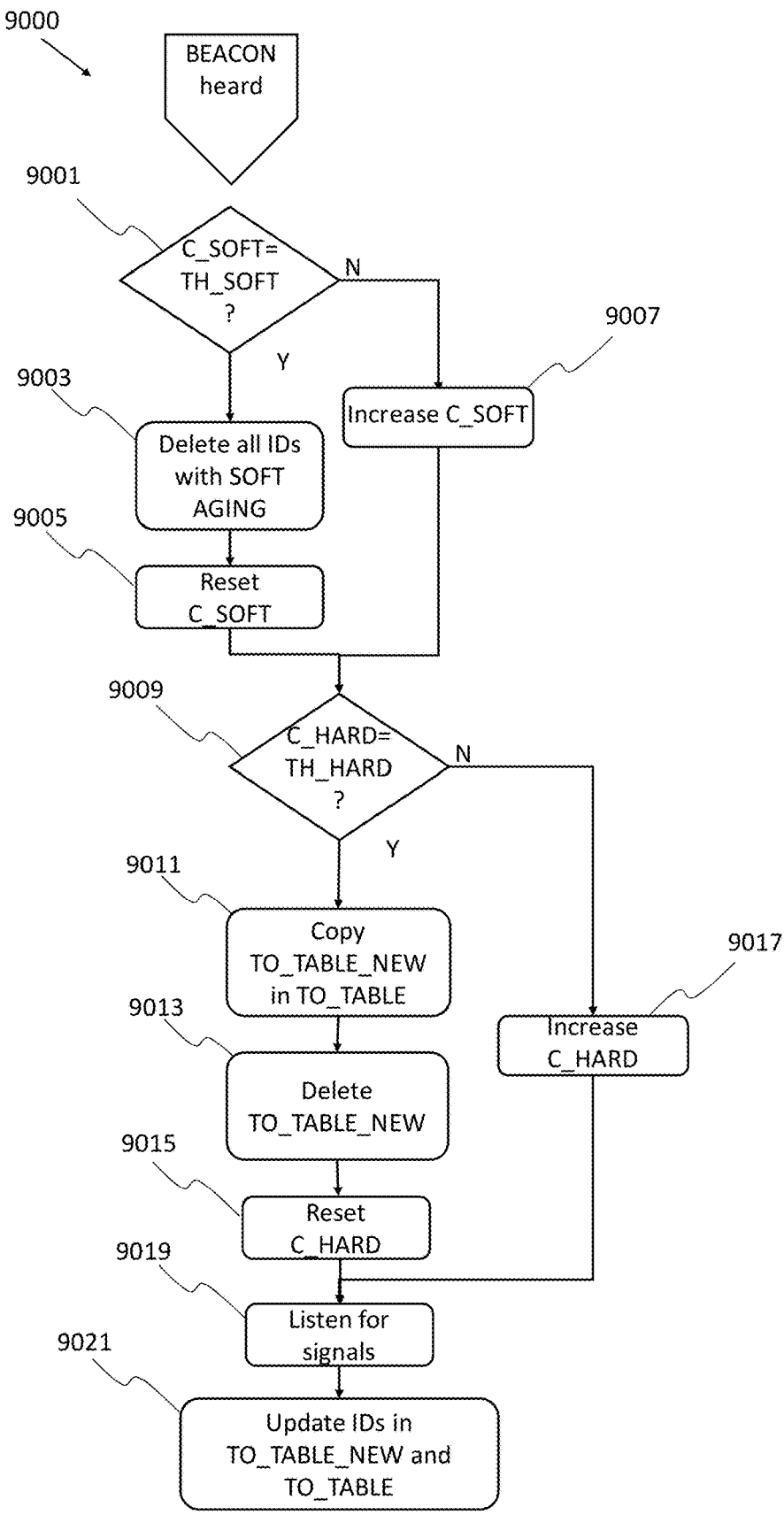
FIG. 17 is a flowchart of a list update procedure executed by fifth and sixth methods of FIGS. 15, and 16A and 16B.

Advantageously, both the methods 7000 and 8000 execute a global list update procedure 9000—of which FIG. 17 is a flowchart—at steps 4045 and 6049.

In detail, the procedure 9000 is triggered by the detection of a beacon signal BEACON at step 1013 of methods 7000 and 8000 and also at step 3033 of method 8000.

Initially, the node Ni verifies whether a first counter C_SOFT has reached a first threshold value TH_SOFT (decision step 9001).

If the first counter C_SOFT has reached the first threshold TH_SOFT (output branch Y of step 9001), the node $N_i$ removes from the first list TO_TABLE and in the second list TO_TABLE_NEW all node identifiers $ID_x$ with the first value SOFT in the age information AGING (step 9003). Next, the first counter C_SOFT is reset (step 9005)

Conversely, is the first counter C_SOFT has not reached the first threshold TH_SOFT (output branch N of step 9001), the node $N_i$ increases the first counter C_SOFT (step 9007).

Following step 9005 or 9007, the node Ni verifies whether a second counter C_HARD has reached a second threshold value TH_HARD (decision step 9009).

If the second counter C_HARD has reached the first threshold TH_SOFT (output branch Y of step 9009), the node $N_i$ copies all the content of the second list TO_TABLE_NEW in the first list TO_TABLE (step 9011). Then, the node $N_i$ deletes all the content of the second list TO_TABLE_NEW (step 9013). Next, the second counter C_HARD is reset (step 9015)

Conversely, if the second counter C_HARD has not reached the second threshold TH_HARD (output branch N of step 9001), the node $N_i$ the node increases the second counter C_HARD (step 9017).

Then, the node $N_i$ listens for signals transmitted over the network (step 9019), and updates the first list TO_TABLE and the second list TO_TABLE_NEW (step 9021). Particularly, the lists are updated by inserting the node identifier $ID_x$ corresponding to the transmission opportunity $TO_x$ in which a signal has been detected, and a respective first value SOFT or second value HARD in the age information AGING based on if only data D or a commit signal COMMIT is detected during the corresponding transmission opportunity $TO_x$, respectively (step 9021).

The invention as conceived is subject to numerous modifications and variants all falling within the scope of the present invention according to the appended claims.

Again, as will be clear to a person skilled in the art, one or more steps of the same method or of different methods above-described can be performed in parallel with one another or in a different order from the one presented above. Likewise, one or more optional steps can be added or removed from one or more of the methods.

Similarly, steps of two or more of the methods of above can be combined in order to provide further embodiments.

Finally, all the details can be replaced with other technically equivalent elements.

In conclusion, the materials used, as well as the contingent shapes and sizes, can be whatever according to the specific implementation requirements without for this reason departing from the scope of protection of the following claims.

The invention claimed is:

1. A method for transmitting data on a communication network, said communication network including a plurality of network nodes connected to one same medium for sending and receiving data signals;
   wherein data are transmitted by network nodes on the medium during transmission cycles;
   wherein each transmission cycle includes a plurality of transmission opportunities each of which is allocated to a respective node based on a node identifier associated with that network node;
   the method comprising at least one network node of the communication network performing the steps of:
   a) listening to the medium for signals transmitted during a transmission cycle;
   b) detecting the node identifiers associated with the network nodes that used a respective transmission opportunity to transmit at least a signal;
   c) creating a list of the node identifiers detected, wherein the node identifiers are listed according to an order of the transmission opportunities in the transmission cycle;
   d) selecting a node identifier subsequent to a node identifier occupying the last position in the list of detected node identifiers;
   e) listening to the medium for a transmission listening time from a start of the transmission opportunity associated with the selected node identifier; and
   if no signal is heard during the transmission listening time:
     f) transmitting data signals over the medium during the transmission opportunity associated with the selected node identifier, and reiterating the method from step e) until a data signals transmission is completed;
   or, if a signal from another network node is heard during the transmission listening time:
     g) adding the currently selected node identifier to the list of detected node identifiers; and
     h) reiterating the method from step d);
   wherein each of steps a) to h) is performed by a same network node of the communication network.

2. Method according to claim 1, wherein a network node of the plurality of network nodes operates as a coordinator node that is configured to transmit a beacon signal that communicates the start of a respective transmission cycle;
   wherein the coordinator node:
   i) listens to the medium for signals transmitted during each transmission cycle; and
   j) upon detecting that all the transmission opportunities of the transmission cycle are used, adds a further transmission opportunity to the next transmission cycles.

3. Method according to claim 2, wherein the coordinator node:
   k) detects that the added transmission opportunity is not used for a predetermined number of consecutive transmission cycles, and removes the added transmission opportunity from the next transmission cycles.

4. Method according to claim 1, wherein:
   l) the at least one network node listens to the medium for detecting a beacon signal transmitted by a coordinator node of the plurality of network nodes, said beacon signal communicating a start of a respective transmission cycle; and
   m) if the at least one network node does not detect the beacon signal within a beacon listening time:
     m1) the at least one network node selects a coordinator node identifier;
     m2) the at least one network node listens to the medium for detecting a beacon signal transmitted by another node during a further beacon listening time;
     m3) if the at least one network node does not detect the beacon signal within the further beacon listening time, the at least one network node transmits the beacon signal over the medium; and
     m4) if the at least one network node detects the beacon signal within the further beacon listening time, the at least one network node iterates the method from step a).

5. Method according to claim 1, wherein the at least one network node:
   n) associates an age value to each node identifier included in the list of the detected node identifiers;
   o) for each transmission cycle in which a transmission opportunity is not used, reduces the age value of the corresponding node identifier; and
   p) when one of the age values reaches a threshold value, removes the corresponding node identifier from the list of detected node identifiers.

6. Method according to claim 5, wherein the at least one network node:
   q) when at least one node identifier is removed from the list of detected node identifiers, and the currently selected node identifier is the last of the list of detected node identifiers;
   r) selects the at least one removed node identifier; and
   s) reiterates the method from step e).

7. Method according to claim 1, wherein the at least one network node:
   t) for each signal heard on the medium during a transmission opportunity, determines if the signal is a commit signal or a data signal, wherein the commit signal request to at least one other network node of the communication network to enter in a receiving state, while the data signal includes information to be delivered to at least one another network node;
u) if the heard signal includes only a data signal, assigns a first age value to an age information associated to the node identifier in the list of detected node identifiers corresponding to the transmission opportunity during which the data signal has been detected;
v) if the heard signal includes a commit signal, assigns a second age value to an age information associated to the node identifier in the list of detected node identifiers corresponding to the transmission opportunity during which the commit signal has been detected, wherein the second age value is greater than the first age value;
w) for each cycle in which at least one transmission opportunity is not used, reduces a value of the age information associated to the node identifier in the list of detected node identifiers associated to the at least one unused transmission opportunity; and
x) when one of the age information reaches a respective threshold value, removes the associated node identifier from the list of detected node identifiers.

8. Method according to claim 1, wherein the at least one network node:
t1) for each signal heard on the medium during a transmission opportunity, determines if the signal is a commit signal or a data signal, wherein the commit signal request toat least one other network node of the communication network to enter in a receiving state, while the data signal includes information to be delivered to at least one another network node;
u1) if the heard signal includes only a data signal, assigns a first age value to an age information associated to the node identifier in the list of detected node identifiers corresponding to the transmission opportunity during which the data signal has been detected;
v1) after each transmission cycle increase a first counter; and
w1) when the first counter reaches a first threshold value, removes from the list of detected node identifiers all the node identifiers associated with a corresponding age information at the first age value.

9. Method according to claim 8, wherein the at least one network node:
u2) if the heard signal includes a commit signal, assigns a second age value to an age information associated to the node identifier in the list of detected node identifiers corresponding to the transmission opportunity during which the commit signal has been detected;
v2) after each transmission cycle increases a second counter; and
w2) when the second counter reaches a second threshold value, removes all the node identifiers from the list of detected node identifiers, the second threshold value being greater than the first threshold value.

10. Method according to claim 9, wherein the at least one network node:
x1) listens to the medium for signals transmitted during a next transmission cycle;
y1) updates the list of detected node identifiers by adding each node identifier associated with any signal heard during the next transmission cycle;
z1) iterates the method from steps d) to w2).

11. Method according to claim 1, wherein the at least one network node:
t3) creates a second list, which is a copy of the list of the detected node identifiers;
u3) for each signal heard on the medium during a transmission opportunity, determines if the signal is a commit signal or a data signal, wherein the commit signal request to at least one other network node of the communication network to enter in a receiving state, while the data signal includes information to be delivered to at least one another network node;
v3) if the heard signal includes only data signal, assigns a first age value to an age information associated to the node identifier in the list of the node identifiers detected corresponding to the transmission opportunity during which the data signal has been detected, wherein the first age value is greater than a second age value;
w3) after each transmission cycle increases a first counter; and
x3) when the first counter reaches a first threshold value, removes any node identifiers associated with a respective age information at the first age value from the list of the node identifiers detected and from the second list.

12. Method according to claim 11, wherein the at least one network node:
v4) if the heard signal includes a commit signal, associates the second age value to the node identifier corresponding to the transmission opportunity during which the commit signal has been detected;
w4) after each transmission cycle increases a second counter; and
x4) when the second counter reaches a second threshold value, copies a content of the second list in the list of the node identifiers detected; and
y4) removes all the node identifiers from the second list.

13. Method according to claim 12, wherein the at least one network node:
z21) listens to the medium for signals transmitted during a next transmission cycle;
z22) updates the list of the node identifiers detected and the second list by adding each node identifier associated with any signal heard during the next transmission cycle; and
z23) iterates the method from steps d) to w4).

14. A method for transmitting data on a communication network, said communication network including a plurality of network nodes connected to one same medium for sending and receiving data signals;
wherein data are transmitted by network nodes on the medium during transmission cycles;
wherein each transmission cycle includes a plurality of transmission opportunities in which one network node of the plurality of network nodes transmits a signal;
the method comprising a network node joining the communication network and performing the steps of:
a) listening to the medium for signals transmitted during a transmission cycle;
b) detecting the node identifiers associated with the network nodes that used a respective transmission opportunity to transmit at least a signal;
c) creating a list of the node identifiers detected, wherein the node identifiers are listed according to an order of the transmission opportunities in the transmission cycle;
d) selecting a node identifier subsequent to a node identifier occupying the last position in the list of detected node identifiers;

e) listening to the medium for a transmission listening time from a start of the transmission opportunity associated with the selected node identifier; and if no signal is heard during the transmission listening time:
   f) transmitting data signals over the medium during the transmission opportunity associated with the selected node identifier, and reiterating the method from step e) until a data signals transmission is completed;

or, if a signal from another network node is heard during the transmission listening time:
   g) adding the currently selected node identifier to the list of detected node identifiers; and
   h) reiterating the method from step d);
   wherein each of steps a) to h) is performed by the network node joining the communication network.

15. Method according to claim 14, wherein:
   i) the network node joining the communication network listens to the medium for detecting a beacon signal transmitted by a coordinator node of the plurality of network nodes, said beacon signal communicating a start of a respective transmission cycle; and
   j) if the network node joining the communication network does not detect the beacon signal within a beacon listening time:
      k1) the network node joining the communication network selects a coordinator node identifier;
      k2) the network node joining the communication network listens to the medium for detecting a beacon signal transmitted by another node during a further beacon listening time;
      k3) if the network node joining the communication network does not detect the beacon signal within the further beacon listening time, the network node joining the communication network transmits the beacon signal over the medium; and
      k4 if the network node joining the communication network detects the beacon signal within the further beacon listening time, the network node joining the communication network iterates the method from step a).

16. Method according to claim 14, wherein the network node joining the communication network:
   l) associates an age value to each node identifier included in the list of the detected node identifiers;
   m) for each transmission cycle in which a transmission opportunity is not used, reduces the age value of the corresponding node identifier; and
   n) when one of the age values reaches a threshold value, removes the corresponding node identifier from the list of detected node identifiers.

17. Method according to claim 14, wherein the network node joining the communication network:
   o) for each signal heard on the medium during a transmission opportunity, determines if the signal is a commit signal or a data signal, wherein the commit signal request to at least one other network node of the communication network to enter in a receiving state, while the data signal includes information to be delivered to at least one another network node;
   p) if the heard signal includes only a data signal, assigns a first age value to an age information associated to the node identifier in the list of detected node identifiers corresponding to the transmission opportunity during which the data signal has been detected;
   q) if the heard signal includes a commit signal, assigns a second age value to an age information associated to the node identifier in the list of detected node identifiers corresponding to the transmission opportunity during which the commit signal has been detected, wherein the second age value is greater than the first age value;
   r) for each cycle in which at least one transmission opportunity is not used, reduces a value of the age information associated to the node identifier in the list of detected node identifiers associated to the at least one unused transmission opportunity; and
   s) when one of the age information reaches a respective threshold value, removes the associated node identifier from the list of detected node identifiers.

18. Method according to claim 14, wherein the network node joining the communication network:
   o1) or each signal heard on the medium during a transmission opportunity, determines if the signal is a commit signal or a data signal, wherein the commit signal request to at least one other network node of the communication network to enter in a receiving state, while the data signal includes information to be delivered to at least one another network node;
   p1) if the heard signal includes only a data signal, assigns a first age value to an age information associated to the node identifier in the list of detected node identifiers corresponding to the transmission opportunity during which the data signal has been detected;
   q1) after each transmission cycle increases a first counter;
   r1) when the first counter reaches a first threshold value, removes from the list of detected node identifiers all the node identifiers associated with a corresponding age information at the first age value;
   s1) if the heard signal includes a commit signal, assigns a second age value to an age information associated to the node identifier in the list of detected node identifiers corresponding to the transmission opportunity during which the commit signal has been detected;
   t1) after each transmission cycle increases a second counter;
   u1) when the second counter reaches a second threshold value, removes all the node identifiers from the list of detected node identifiers, the second threshold value being greater than the first threshold value;
   v1) listens to the medium for signals transmitted during any next transmission cycle after the transmission cycle in which the network node has joined the communication network;
   w1) updates the list of detected node identifiers by adding each node identifier associated with any signal heard during the next transmission cycle;
   x1) iterates the method from steps d) to u1).

19. Method according to claim 14, wherein the network node joining the communication network:
   o2) creates a second list, which is a copy of the list of the detected node identifiers;
   p2) for each signal heard on the medium during a transmission opportunity, determines if the signal is a commit signal or a data signal, wherein the commit signal request to at least one other network node of the communication network to enter in a receiving state, while the data signal includes information to be delivered to at least one another network node;
   r2) if the heard signal includes only data signal, assigns a first age value to an age information associated to the node identifier in the list of the node identifiers detected corresponding to the transmission opportunity during which the data signal has been detected, wherein the first age value is greater than a second age value;

s2) after each transmission cycle increases a first counter; and t2) when the first counter reaches a first threshold value, removes any node identifiers associated with a respective age information at the first age value from the list of the node identifiers detected and from the second list.

20. Method according to claim 19, wherein the network node joining the communication network:

u2) if the heard signal includes a commit signal, associates the second age value to the node identifier corresponding to the transmission opportunity during which the commit signal has been detected;

v2) after each transmission cycle increases a second counter; and w2) when the second counter reaches a second threshold value, copies a content of the second list in the list of the node identifiers detected;

x2) removes all the node identifiers from the second list;

y2) listens to the medium for signals transmitted during any next transmission cycle after the transmission cycle in which the network node has joined the communication network;

z21) updates the list of the node identifiers detected and the second list by adding each node identifier associated with any signal heard during the next transmission cycle; and z22) iterates the method from steps d) to x2).

* * * * *